(12) United States Patent
Kim et al.

(10) Patent No.: US 12,200,778 B2
(45) Date of Patent: Jan. 14, 2025

(54) METHOD FOR PERFORMING LOW LATENCY COMMUNICATION IN WIRELESS LAN SYSTEM

(71) Applicant: LG ELECTRONICS INC., Seoul (KR)

(72) Inventors: Suhwook Kim, Seoul (KR); Jeongki Kim, Seoul (KR); Kiseon Ryu, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 419 days.

(21) Appl. No.: 17/596,342

(22) PCT Filed: May 28, 2020

(86) PCT No.: PCT/KR2020/006931
§ 371 (c)(1),
(2) Date: Dec. 8, 2021

(87) PCT Pub. No.: WO2020/251197
PCT Pub. Date: Dec. 17, 2020

(65) Prior Publication Data
US 2022/0240311 A1    Jul. 28, 2022

Related U.S. Application Data

(60) Provisional application No. 62/861,302, filed on Jun. 13, 2019.

(51) Int. Cl.
*H04W 84/12* (2009.01)
*H04W 74/00* (2009.01)
*H04W 74/0833* (2024.01)

(52) U.S. Cl.
CPC ....... *H04W 74/085* (2013.01); *H04W 74/002* (2013.01); *H04W 84/12* (2013.01)

(58) Field of Classification Search
CPC . H04W 74/085; H04W 74/008; H04W 84/12; H04W 56/001; H04W 74/08; H04W 28/02; H04L 27/26025; H04L 1/00
See application file for complete search history.

(56) References Cited

U.S. PATENT DOCUMENTS 9,825,678 B2 * 11/2017 Chu ............ H04W 72/21
11,116,035 B2 * 9/2021 Ahn ............ H04L 5/0055
(Continued)

FOREIGN PATENT DOCUMENTS

KR    20180098613    9/2018

OTHER PUBLICATIONS

PCT International Application No. PCT/KR2020/006931, International Search Report dated Aug. 25, 2020, 4 pages.
(Continued)

*Primary Examiner* — Kodzovi Acolatse
*Assistant Examiner* — Anindita Sen
(74) *Attorney, Agent, or Firm* — LEE, HONG, DEGERMAN, KANG & WAIMEY

(57) ABSTRACT

An embodiment according to the present specification relates to a method for performing low latency communication. An STA can determine a first parameter set between the first parameter set and a second parameter set on the basis of the time delay value of uplink data. The STA can access a channel on the basis of the first parameter set and transmit the uplink data to an AP.

6 Claims, 30 Drawing Sheets

Figure 9-15d-Control Information subfield for OM Control

(56) References Cited

U.S. PATENT DOCUMENTS

| | | | |
|---|---|---|---|
| 11,388,747 B2* | 7/2022 | Tooher | H04W 72/0446 |
| 11,595,996 B2* | 2/2023 | Baron | H04W 74/0816 |
| 2018/0027590 A1* | 1/2018 | Yerramalli | H04W 16/14 |
| | | | 370/328 |
| 2019/0150196 A1* | 5/2019 | Koorapaty | H04L 1/1812 |
| | | | 370/329 |
| 2020/0029350 A1* | 1/2020 | Asterjadhi | H04W 72/543 |
| 2022/0132370 A1* | 4/2022 | Wakao | H04W 24/10 |

OTHER PUBLICATIONS

Kim et al., "Latency analysis for EHT," IEEE 802.11-19/0762r0, May 2019, 32 pages.

Rantala et al., "Reducing Channel Access Delay," IEEE 802.11-19/0402r1, Mar. 2019, 13 pages.

* cited by examiner

FIG. 1
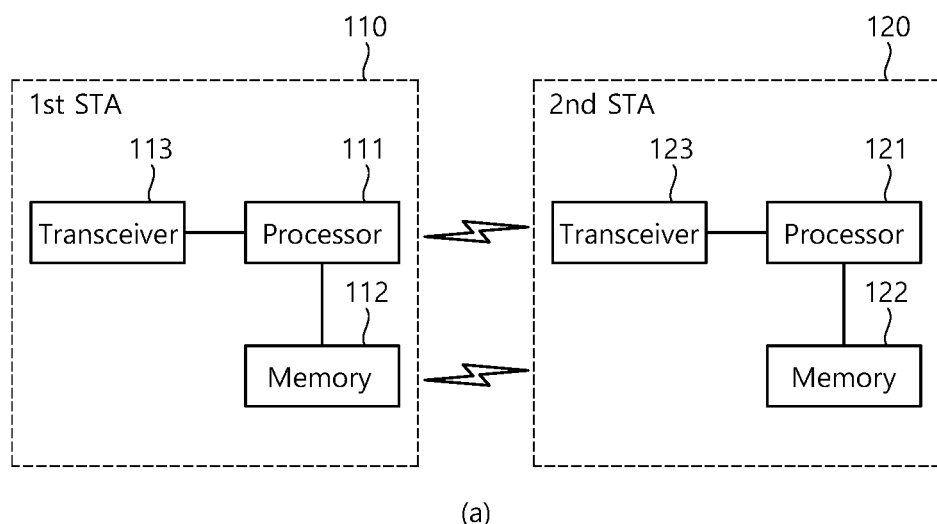
(a)
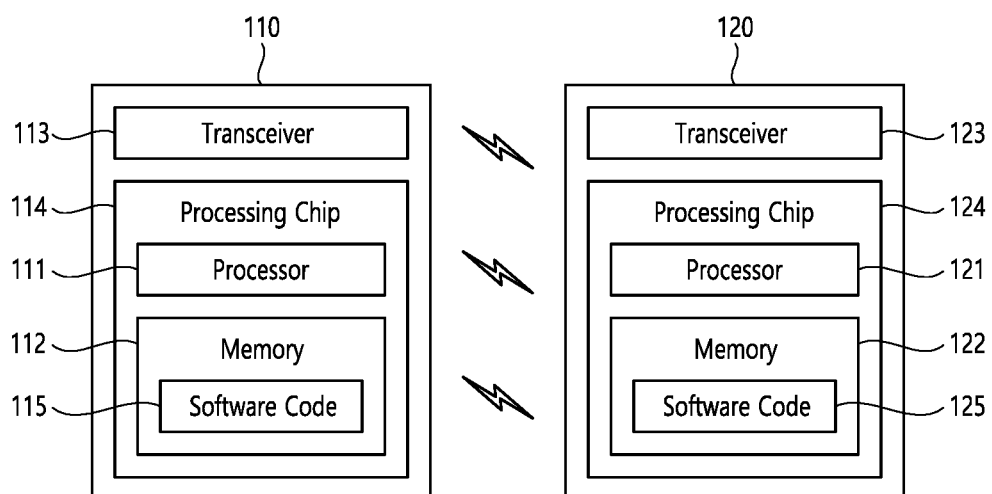
(b)

FIG. 2
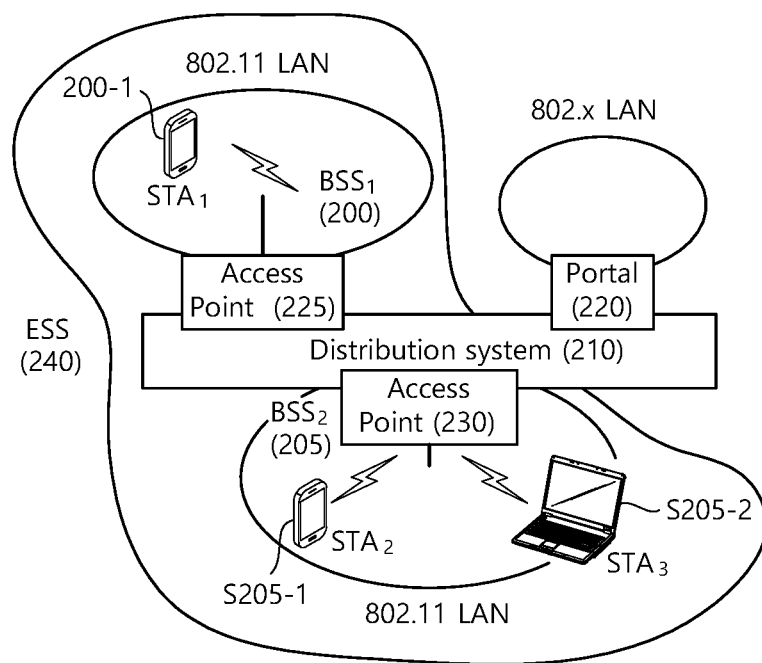
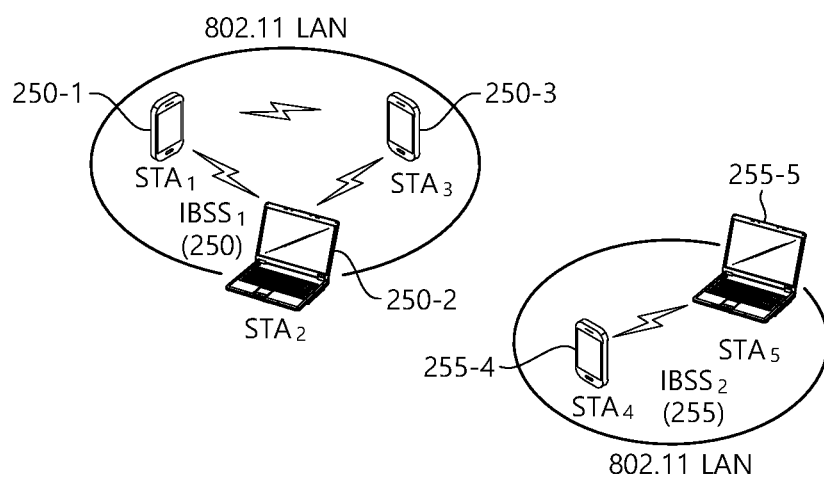

FIG. 21

| Multi-band support (2110) | Low latency support (2120) | 16 Stream support (2130) | 320 MHz support (2140) |

| Element ID | Length (55) | TS Info | Nominal MSDU Size | Maximum MSDU Size | Minimum Service Interval | Maximum Service Interval | Inactivity Interval | Suspension Interval |
|---|---|---|---|---|---|---|---|---|
| 1 | 1 | 3 | 2 | 2 | 4 | 4 | 4 | 4 |

Octets:

| Service Start Time | Minimum Data Rate | Mean Data Rate | Peak Data Rate | Burst Size | Delay Bound | Minimum PHY Rate | Surplus Bandwidth Allowance | Medium Time | DMG Attributes |
|---|---|---|---|---|---|---|---|---|---|
| 4 | 4 | 4 | 4 | 4 | 4 | 4 | 2 | 2 | 0 or 2 |

Octets:

| Element ID | Length (55) | TS Info | Nomianl MSDU Size | Maximum MSDU Size | Minimum Service Interval | Maximum Service Interval | Inactivity Interval | Suspension Interval | Delay Jitter | Required Packet Loss |
|---|---|---|---|---|---|---|---|---|---|---|
| 1 | 1 | 3 | 2 | 2 | 4 | 4 | 4 | 4 | 2 | 2 |

Octets:

2310  2320

| Service Start Time | Minimum Data Rate | Mean Data Rate | Peak Data Rate | Burst Size | Delay Bound | Minimum PHY Rate | Surplus Bandwidth Allowance | Medium Time | DMG Attributes |
|---|---|---|---|---|---|---|---|---|---|
| 4 | 4 | 4 | 4 | 4 | 4 | 4 | 2 | 2 | 0 or 2 |

Octets:

Figure 9-15d-Control Information subfield for OM Control

METHOD FOR PERFORMING LOW LATENCY COMMUNICATION IN WIRELESS LAN SYSTEM

CROSS-REFERENCE TO RELATED APPLICATIONS

This application is the National Stage filing under 35 U.S.C. 371 of International Application No. PCT/KR2020/006931, filed on May 28, 2020, which claims the benefit of U.S. Provisional Application No. 62/861,302, filed on Jun. 13, 2019, the contents of which is hereby incorporated by reference herein in its entirety.

BACKGROUND

Technical Field

The present specification relates to a technique for transmitting and receiving data in wireless communication and, more particularly, to a method and a device for performing low-latency communication in a wireless local area network (WLAN) system.

Related Art

A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

In recent years, with a surge in wired/wireless traffic, time delay-sensitive traffic has also significantly increased. Time delay-sensitive traffic substantially includes real-time audio/video transmissions, and there is a growing need to support time delay-sensitive traffic in a wireless environment with proliferation of multimedia devices. In the wireless environment, transmission speed is lower than that in a wired environment and there is interference caused by surroundings, and thus various methods are required to support time delay-sensitive traffic.

In particular, a WLAN is a communication system in which contention is equally performed in an industrial, scientific, and medical (ISM) band without a channel monopoly by a central base station. Therefore, it is difficult for a WLAN to support time delay-sensitive traffic, compared to communications other than the WLAN. Accordingly, the present specification may propose a technique for supporting time delay-sensitive traffic.

A method performed by a STA in a wireless local area network system according to various embodiments may include: determining a first parameter set among the first parameter set and a second parameter set based on a time delay value of uplink data; performing channel access based on the first parameter set; and transmitting the uplink data to an access point (AP) based on the channel access.

According to an embodiment of the present specification, there may be proposed a method for supporting time delay-sensitive traffic. When a wireless channel condition drastically changes, a STA may perform channel access using an EDCA parameter rather than a MU EDCA parameter. Accordingly, it is possible to alleviate a sudden increase in latency.

According to an embodiment of the present specification, a resource does not need to be allocated in advance in order to prevent a sudden increase in latency of uplink data, thus not wasting a resource.

BRIEF DESCRIPTION OF THE DRAWINGS

FIG. 1 illustrates an example of a transmitting apparatus and/or receiving apparatus of the present specification.

FIG. 2 is a conceptual view illustrating the structure of a wireless local area network (WLAN).

FIG. 21 illustrates an example of an EHT capability information element field configuration.

FIG. 22 illustrates an example of a TSPEC element field configuration.

FIG. 23 illustrates another example of a TSPEC element field configuration.

DESCRIPTION OF EXEMPLARY EMBODIMENTS

Figure 3:
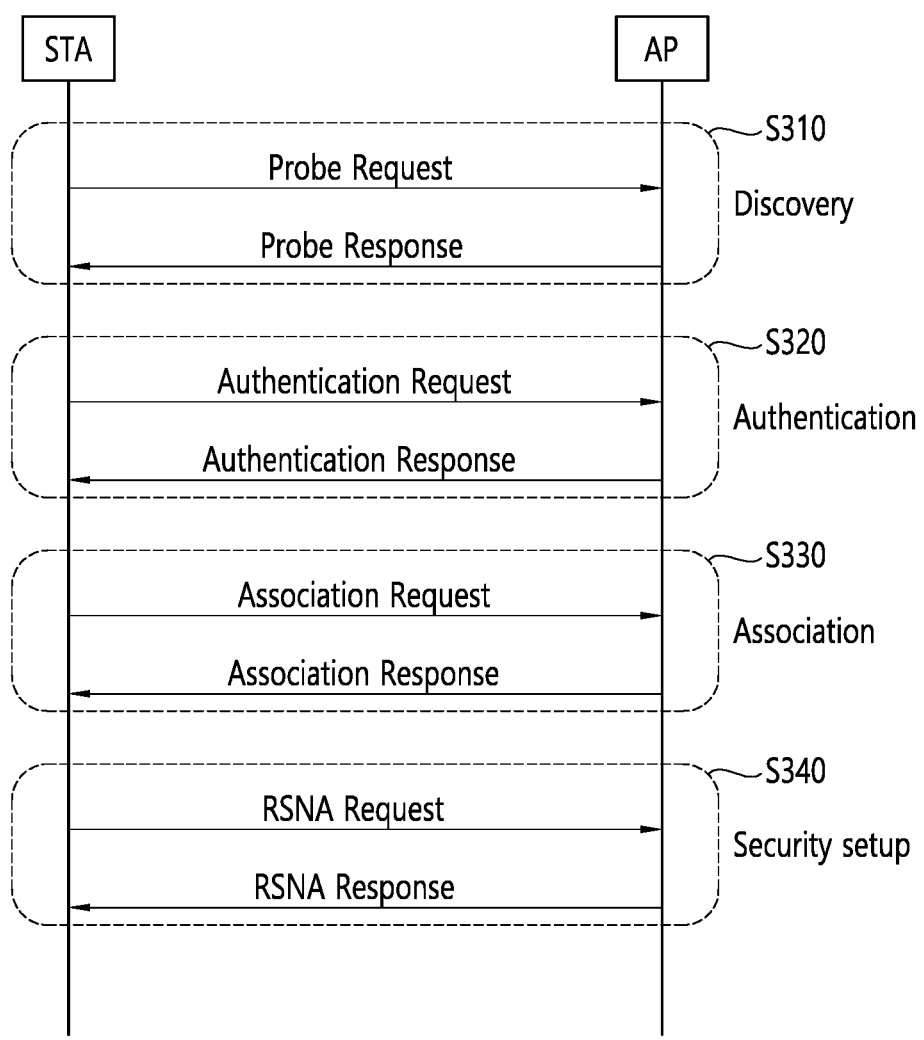
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 illustrates an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (i.e. EE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (i.e. EE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
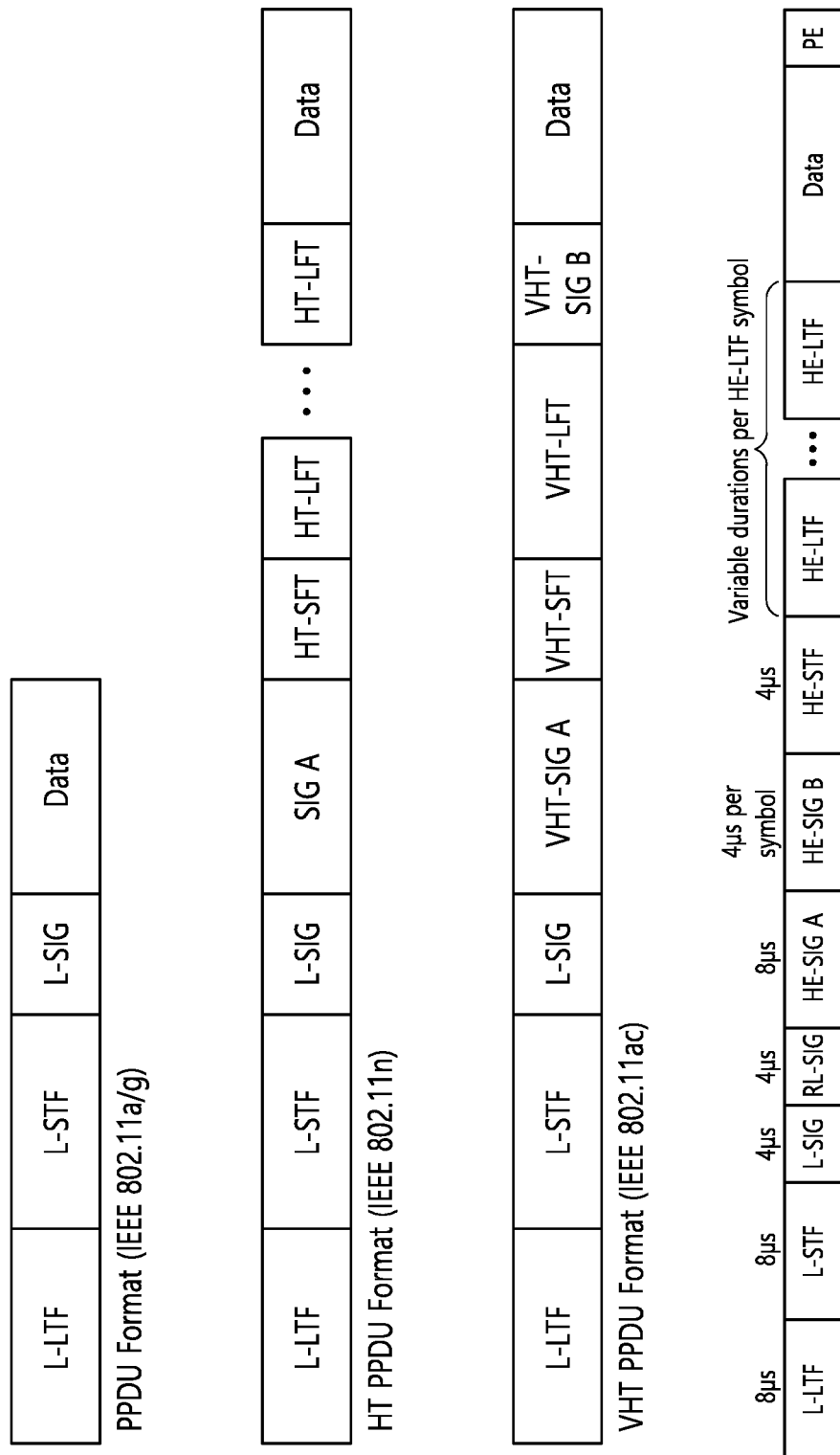
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
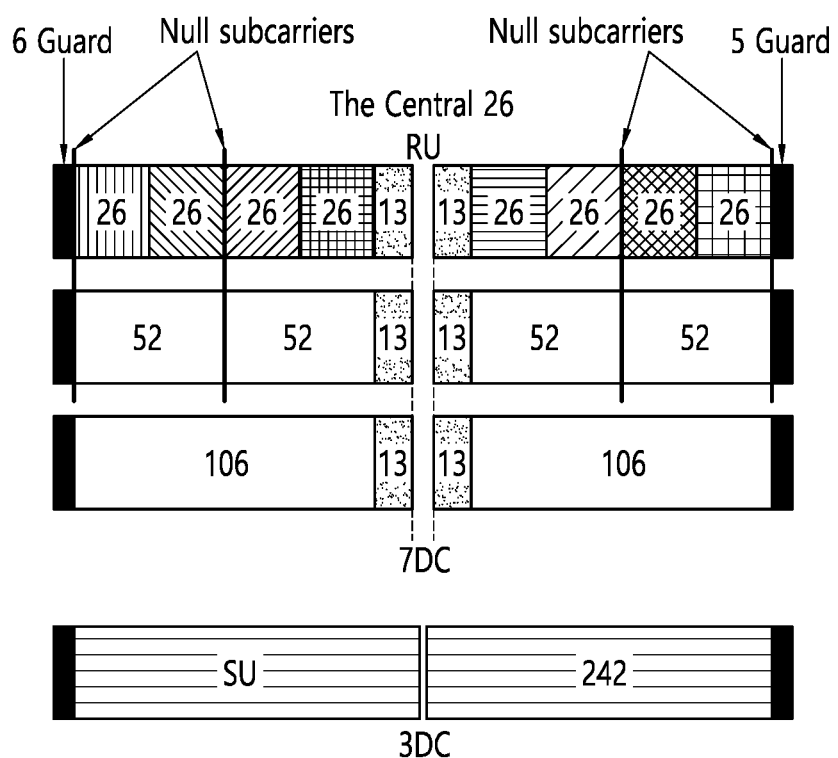
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
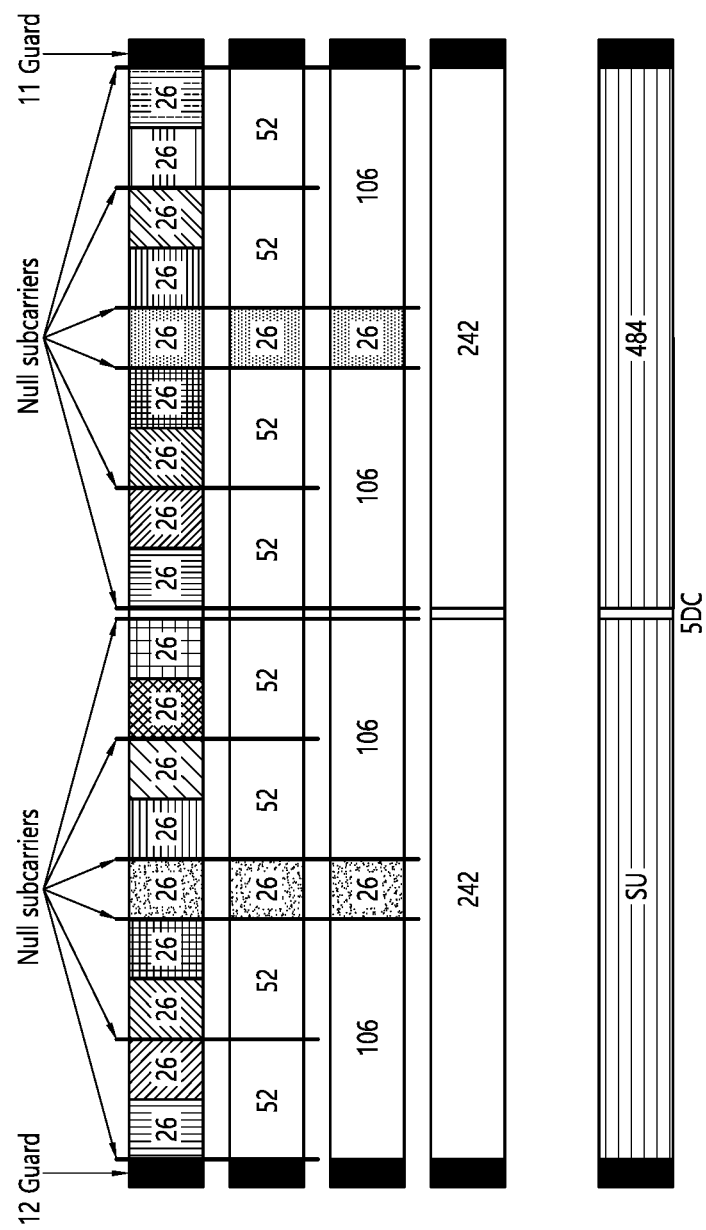
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
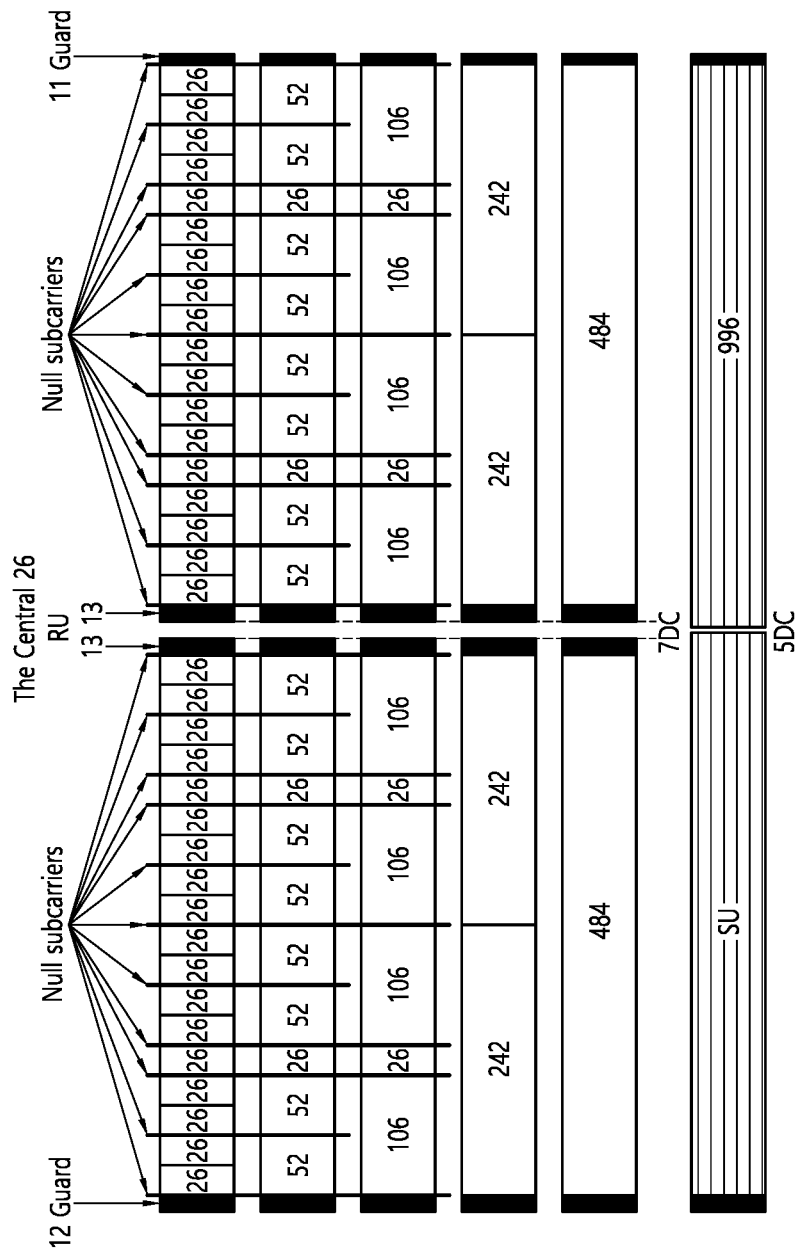
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

In the meantime, the fact that the specific number of RUs can be changed is the same as those of FIGS. 5 and 6.

The RU arrangement (i.e., RU location) shown in FIGS. 5 to 7 can be applied to a new wireless LAN system (e.g. EHT system) as it is. Meanwhile, for the 160 MHz band supported by the new WLAN system, the RU arrangement for 80 MHz (i.e., an example of FIG. 7) may be repeated twice, or the RU arrangement for the 40 MHz (i.e., an example of FIG. 6) may be repeated 4 times. In addition, when the EHT PPDU is configured for the 320 MHz band, the arrangement of the RU for 80 MHz (i.e., an example of FIG. 7) may be repeated 4 times or the arrangement of the RU for 40 MHz (i.e., an example of FIG. 6) may be repeated 8 times.

One RU of the present specification may be allocated for a single STA (e.g., a single non-AP STA). Alternatively, a plurality of RUs may be allocated for one STA (e.g., a non-AP STA).

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
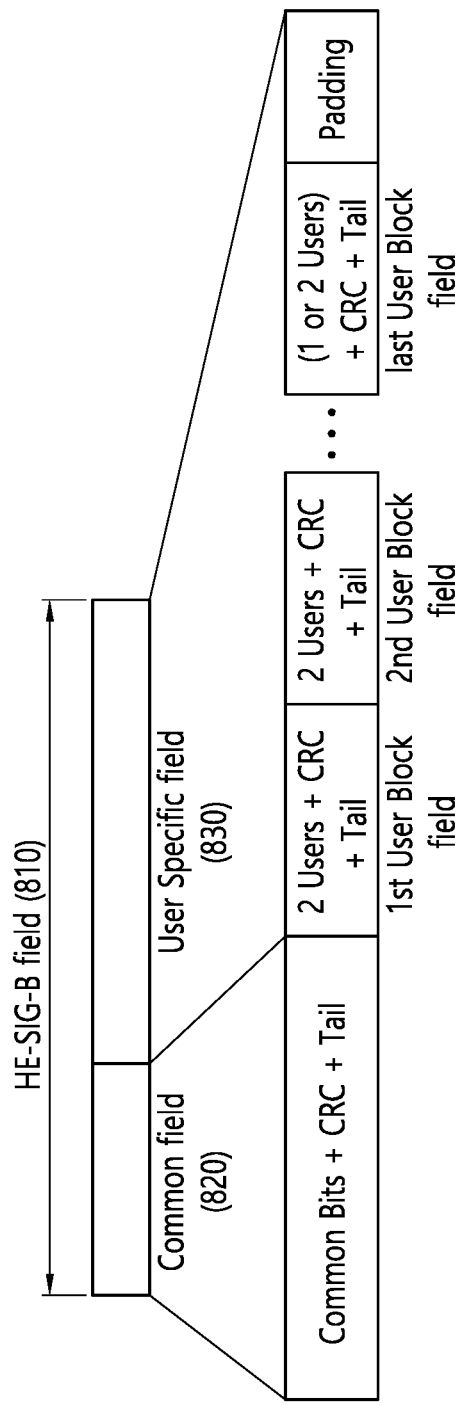
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | 106 | | | 26 | 26 | 26 | 26 | 26 | 8 |
| 01001$y_2y_1y_0$ | | 106 | | | 26 | 26 | 26 | 52 | | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000$y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
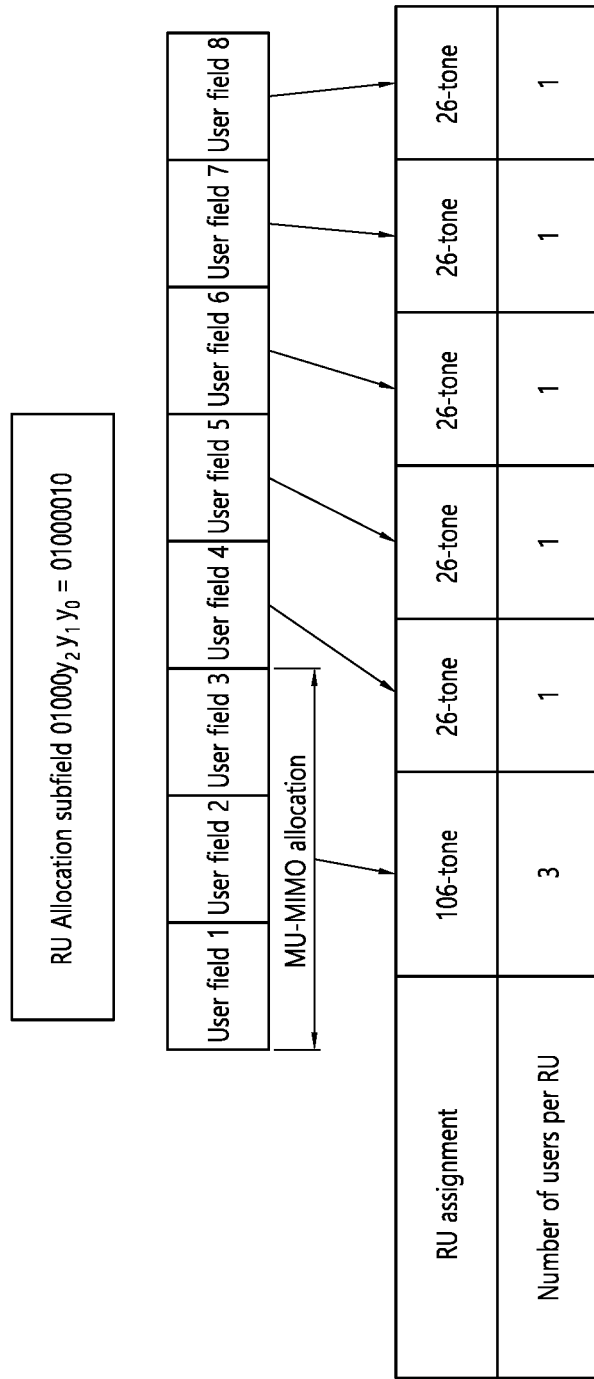
FIG. 9 illustrates an example in which a plurality of user STAs is allocated to the same RU through a MU-MIMO scheme.

FIG. 9 illustrates an example in which a plurality of user STAs is allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.).

TABLE 3

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

45

TABLE 4

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS [3] may be determined as shown in Table 3. For example, Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
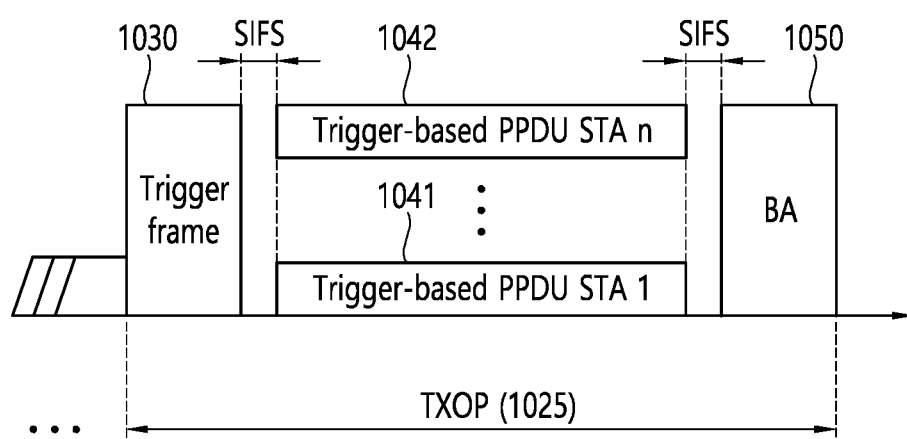
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
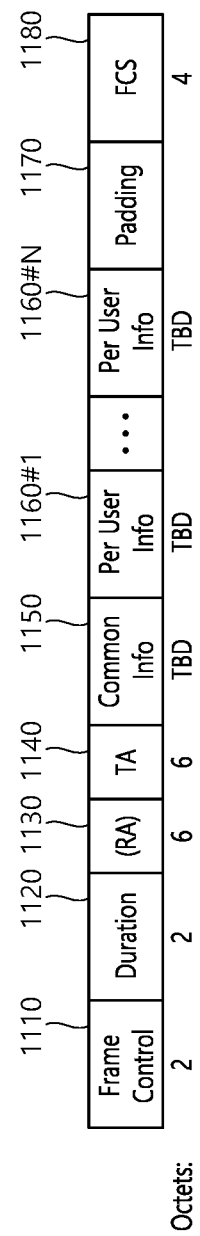
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
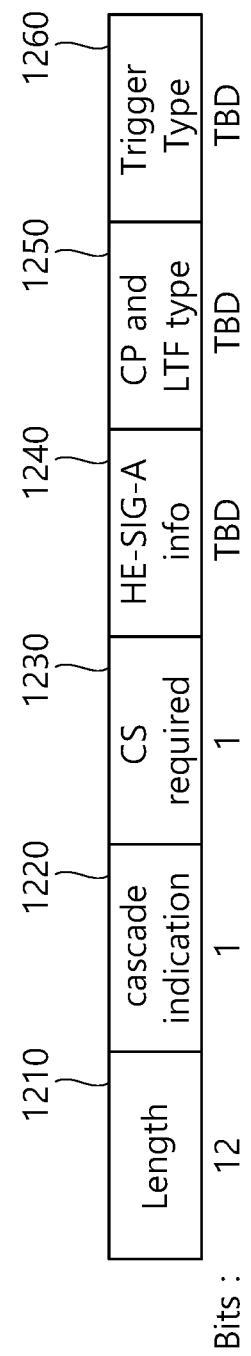
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
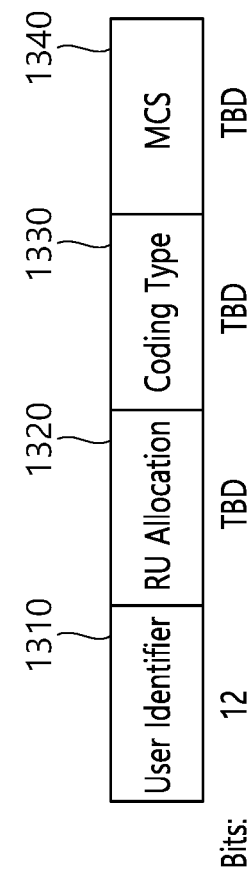
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
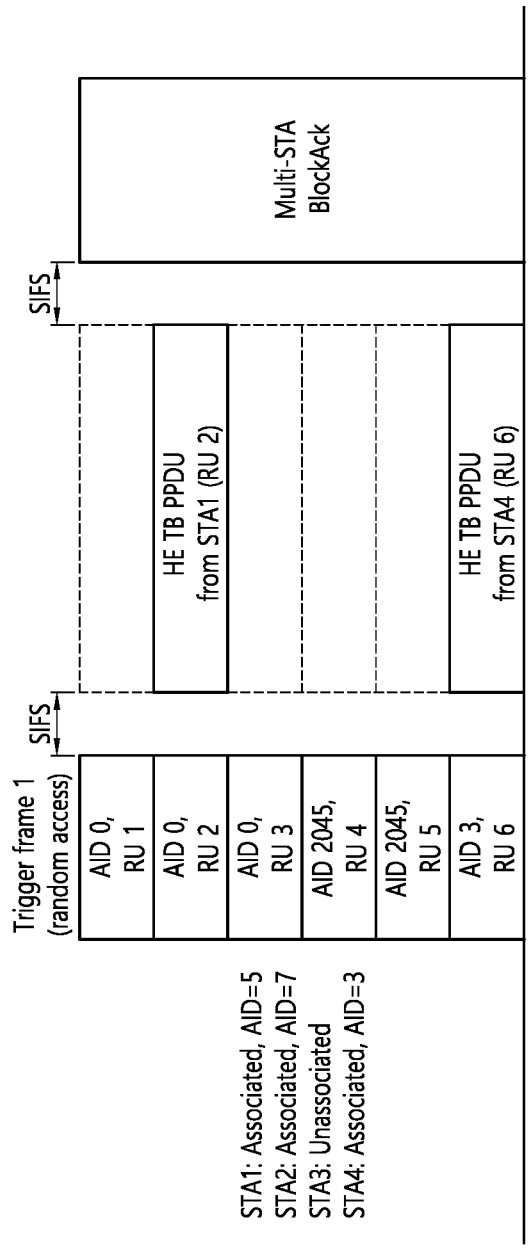
FIG. 14 illustrates a technical feature of a UORA scheme.

FIG. 14 illustrates a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
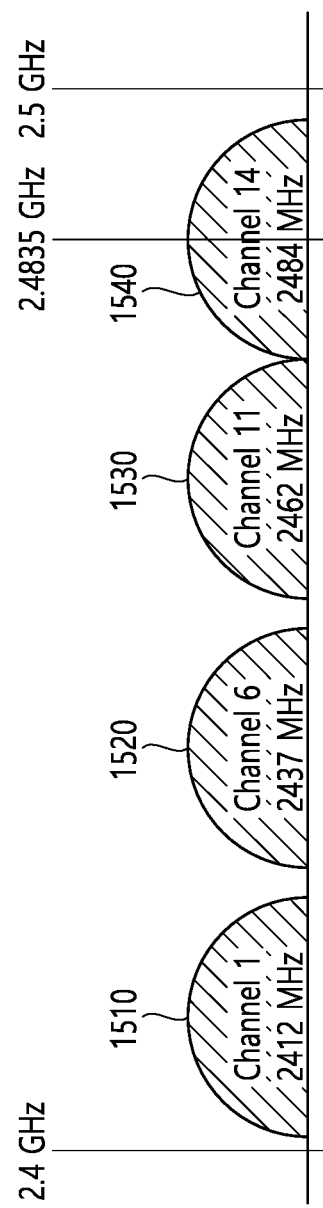
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be $(2.407+0.005*N)$ GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
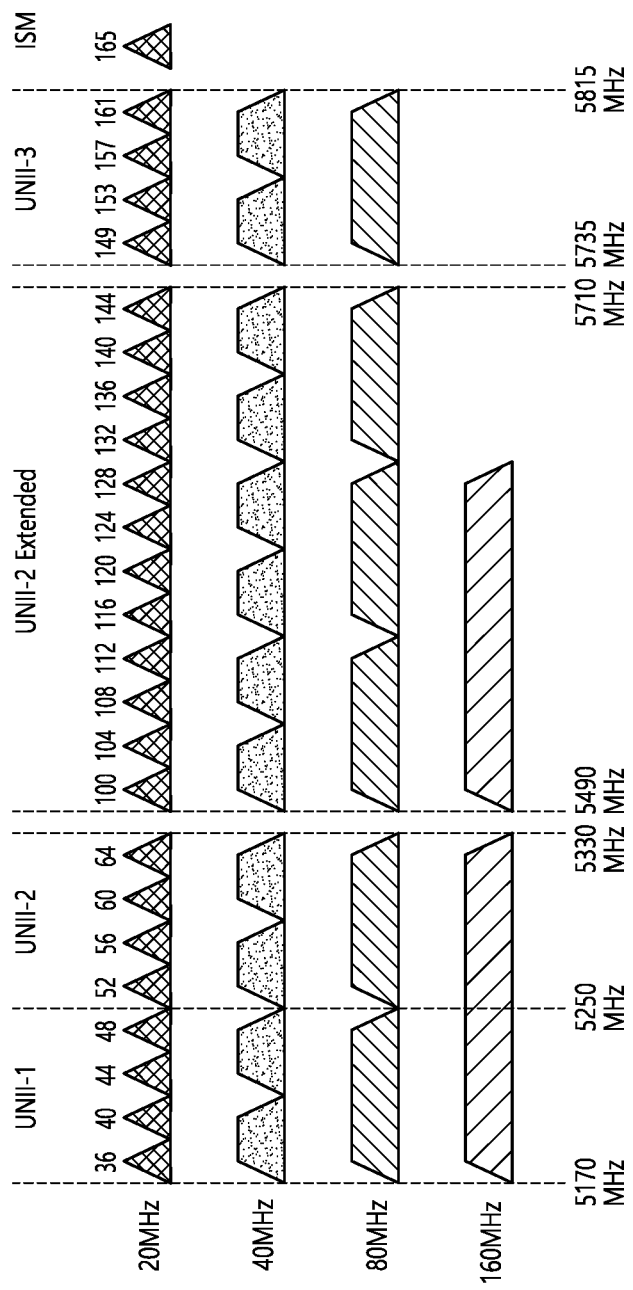
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNIT Low. The UNII-2 may include a frequency domain called UNIT Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
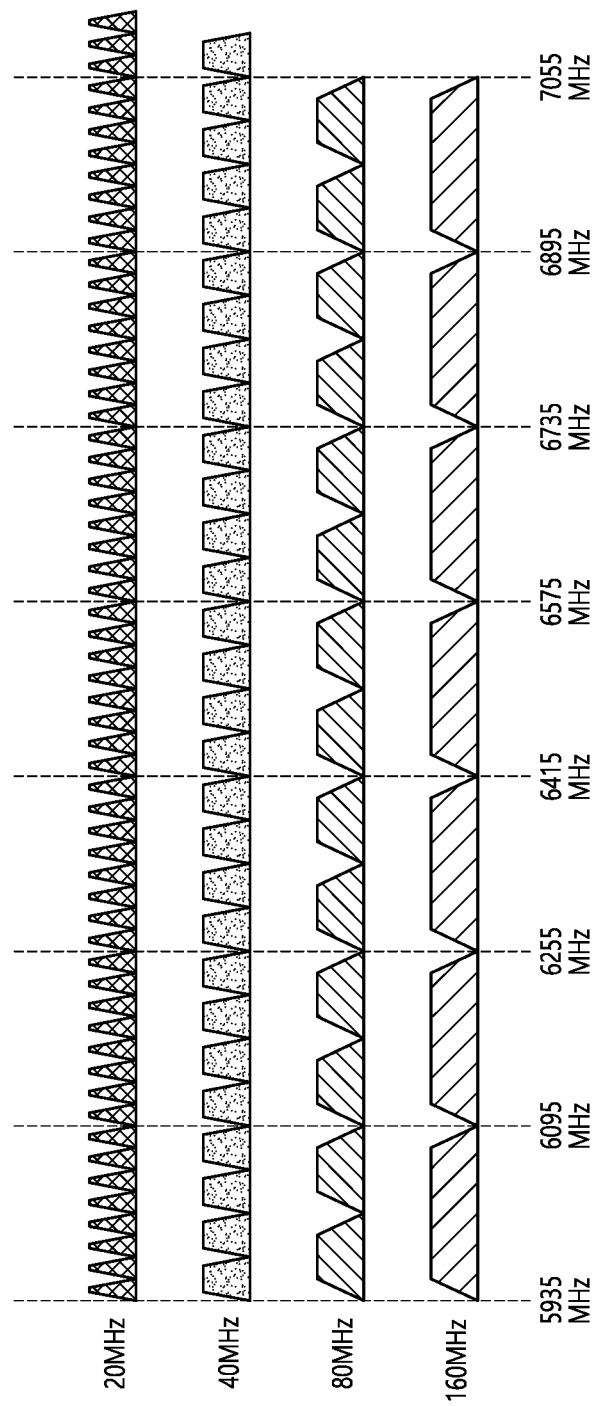
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
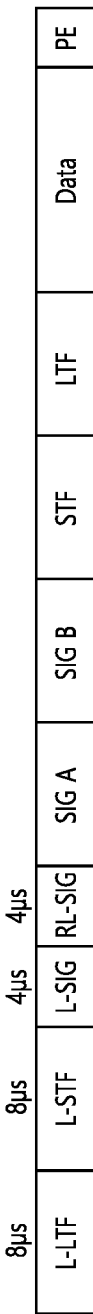
FIG. 18 illustrates an example of a PPDU used in the present specification.

FIG. 18 illustrates an example of a PPDU used in the present specification.

The PPDU 1800 depicted in FIG. 18 may be referred to as various terms such as an EHT PPDU, a TX PPDU, an RX PPDU, a first type or N-th type PPDU, or the like. In addition, the EHT PPDU may be used in an EHT system and/or a new WLAN system enhanced from the EHT system.

The subfields 1801 to 1810 depicted in FIG. 18 may be referred to as various terms. For example, a SIG A field 1805 may be referred to an EHT-SIG-A field, a SIG B field 1806 may be referred to an EHT-SIG-B, an STF field 1807 may be referred to an EHT-STF field, and an LTF field 1808 may be referred to an EHT-LTF.

The subcarrier spacing of the L-LTF, L-STF, L-SIG, and RL-SIG fields 1801, 1802, 1803, and 1804 of FIG. 18 can be set to 312.5 kHz, and the subcarrier spacing of the STF, LTF, and Data fields 1807, 1808, and 1809 of FIG. 18 can be set to 78.125 kHz. That is, the subcarrier index of the L-LTF, L-STF, L-SIG, and RL-SIG fields 1801, 1802, 1803, and 1804 can be expressed in unit of 312.5 kHz, and the subcarrier index of the STF, LTF, and Data fields 1807, 1808, and 1809 can be expressed in unit of 78.125 kHz.

The SIG A and/or SIG B fields of FIG. 18 may include additional fields (e.g., a SIG C field or one control symbol, etc.). The subcarrier spacing of all or part of the SIG A and SIG B fields may be set to 312.5 kHz, and the subcarrier spacing of all or part of newly-defined SIG field(s) may be set to 312.5 kHz. Meanwhile, the subcarrier spacing for a part of the newly-defined SIG field(s) may be set to a pre-defined value (e.g., 312.5 kHz or 78.125 kHz).

In the PPDU of FIG. 18, the L-LTF and the L-STF may be the same as conventional L-LTF and L-STF fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to the number of octets of a corresponding Physical Service Data Unit (PSDU). For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG which is identical to the L-SIG. BPSK modulation may be applied to the RL-SIG. The receiving STA may figure out that the RX PPDU is the HE PPDU or the EHT PPDU, based on the presence of the RL-SIG.

After RL-SIG of FIG. 18, for example, an EHT-SIG-A or one control symbol may be inserted. A symbol located after the RL-SIG (i.e., the EHT-SIG-A or one control symbol in the present specification) may be referred as various names, such as a U-SIG (Universal SIG) field.

A symbol consecutive to the RL-SIG (e.g., U-SIG) may include information of N bits, and may include information for identifying the type of the EHT PPDU. For example, the U-SIG may be configured based on two symbols (e.g., two consecutive OFDM symbols). Each symbol (e.g., OFDM symbol) for U-SIG may have a duration of 4 us. Each symbol of the U-SIG may be used to transmit 26-bit information. For example, each symbol of the U-SIG may be transmitted/received based on 52 data tones and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIG may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is classified into various types (e.g., EHT PPDU supporting SU, EHT PPDU supporting MU, EHT PPDU related to Trigger Frame, EHT PPDU related to Extended Range transmission, etc.), information related to the type of the EHT PPDU may be included in version-independent bits or version-dependent bits of the U-SIG.

For example, the U-SIG field includes 1) a bandwidth field including information related to a bandwidth, 2) a field including information related an MCS scheme applied to the SIG-B, 3) a dual subcarrier modulation in the SIG-B (i.e., an indication field including information related to whether the dual subcarrier modulation) is applied, 4) a field including information related to the number of symbols used for the SIG-B, 5) a field including information on whether the SIG-B is generated over the entire band, 6) a field including information related to a type of the LTF/STF, and/or 7) information related to a field indicating a length of the LTF and the CP.

The SIG-B of FIG. 18 may include the technical features of HE-SIG-B shown in the example of FIGS. 8 to 9 as it is.

An STF of FIG. 18 may be used to improve automatic gain control estimation in a multiple input multiple output (MIMO) environment or an OFDMA environment. An LTF of FIG. 18 may be used to estimate a channel in the MIMO environment or the OFDMA environment.

The EHT-STF of FIG. 18 may be set in various types. For example, a first type of STF (e.g., 1x STF) may be generated based on a first type STF sequence in which a non-zero coefficient is arranged with an interval of 16 subcarriers. An STF signal generated based on the first type STF sequence may have a period of 0.8p, and a periodicity signal of 0.8 µs may be repeated 5 times to become a first type STF having a length of 4 µs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6p, and a periodicity signal of 1.6 µs may be repeated 5 times to become a second type STF having a length of 8 µs. For example, a third type of STF (e.g., 4×STF) may be generated based on a third type STF sequence in which a non-zero coefficient is arranged with an interval of 4 subcarriers. An STF signal generated based on the third type STF sequence may have a period of 3.2 µs, and a periodicity signal of 3.2 µs may be repeated 5 times to become a second type STF having a length of 16 µs. Only some of the first to third type EHT-STF sequences may be used. In addition, the EHT-LTF field may also have first, second, and third types (i.e., 1×, 2×, 4×LTF). For example, the first/second/third type LTF field may be generated based on an LTF sequence in which a non-zero coefficient is arranged with an interval of 4/2/1 subcarriers. The first/second/third type LTF may have a time length of 3.2/6.4/12.8 µs. In addition, Guard Intervals (GIs) with various lengths (e.g., 0.8/1/6/3.2 µs) may be applied to the first/second/third type LTF.

Information related to the type of STF and/or LTF (including information related to GI applied to the LTF) may be included in the SIG A field and/or the SIG B field of FIG. 18.

The PPDU of FIG. 18 may support various bandwidths. For example, the PPDU of FIG. 18 may have a bandwidth of 20/40/80/160/240/320 MHz. For example, at least one field (e.g., STF, LTF, data) of FIG. 18 may be configured based on RUs illustrated in FIGS. 5 to 7, and the like. For example, when there is one receiving STA of the PPDU of FIG. 18, all fields of the PPDU of FIG. 18 may occupy the entire bandwidth. For example, when there are multiple receiving STAs of the PPDU of FIG. 18 (i.e., when MU PPDU is used), some fields (e.g., STF, LTF, data) of FIG. 18 may be configured based on the RUs shown in FIGS. 5 to 7. For example, the STF, LTF, and data fields for the first receiving STA of the PPDU may be transmitted/received through a first RU, and the STF, LTF, and data fields for the second receiving STA of the PPDU may be transmitted/received through a second RU. In this case, the locations/positions of the first and second RUs may be determined based on FIGS. 5 to 7, and the like.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
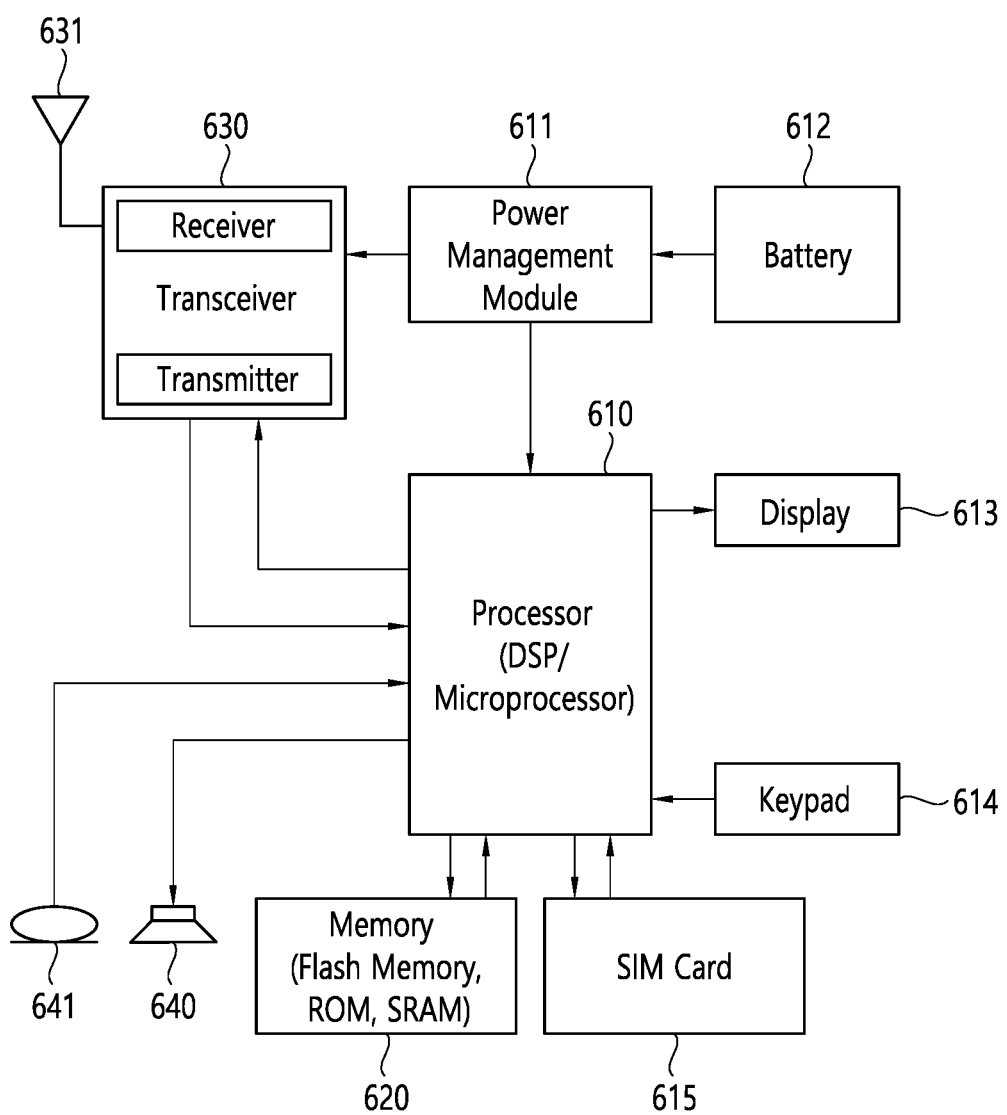
FIG. 19 illustrates an example of a modified transmitting apparatus and/or receiving apparatus of the present specification.

FIG. 19 illustrates an example of a modified transmitting apparatus and/or receiving apparatus of the present specification.

Each apparatus/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Hereinafter, a method for performing low-latency communication is described. Low-latency communication may refer to a technique for supporting traffic sensitive to a time delay (i.e., low-latency traffic). A time delay may refer to latency defined in IEEE 802.11ax.

For example, a time delay (i.e., latency) may refer to a time from when a frame is entered into a queue of a MAC layer to when the frame is deleted from the queue of the MAC layer. Specifically, a frame may be entered into a queue of a MAC layer of a transmitting STA (e.g., an AP). The frame may then be transmitted through a PHY layer of the transmitting STA. The frame may be successfully received by a receiving STA. The transmitting STA may receive an ACK/block ACK frame or the like from the receiving STA. The transmitting STA may delete the frame from the queue of the MAC layer. Here, a time delay may refer to a time from when the frame is entered into the queue of the MAC layer to when the frame is deleted from the queue of the MAC layer. Hereinafter, for convenience of description, the transmitting STA may be referred to as an access point (AP). The receiving STA may be referred to as a STA.

Various techniques may be required to support time delay-sensitive traffic. For example, a low-latency frame transmission method, a low-latency retransmission method, a low-latency channel contention method, or a low-latency signaling method may be required.

For example, the low-latency frame transmission method (or low-latency communication technique) may refer to a technique for reducing a time delay when a data frame is transmitted. In another example, the low-latency retransmission method may refer to a technique for reducing a time delay when a data frame is retransmitted after transmission of the data frame fails. In still another example, the low-latency channel contention method may refer to a technique for reducing a time delay by improving a channel contention method. In yet another example, the low-latency signaling method may refer to a signaling technique for exchanging information related to low-latency communication between a STA and an AP to perform low-latency communication.

Hereinafter, the present specification may propose various techniques for supporting time delay-sensitive traffic. The traffic may include various types of traffic. For example, the traffic may be divided into at least two types of traffic. In one example, first traffic may be traffic sensitive to a time delay. Second traffic may be traffic not sensitive to a time delay. Classification of traffic according to a time delay is only one example, and a classification criterion may be variously set. For example, the classification criterion may include at least one of a time delay, machine-type communication, or importance.

Traffic described below in the present specification may refer to a type of traffic different from conventional traffic. For example, the traffic described below in the present specification may refer to traffic sensitive to a time delay.

Figure 20:
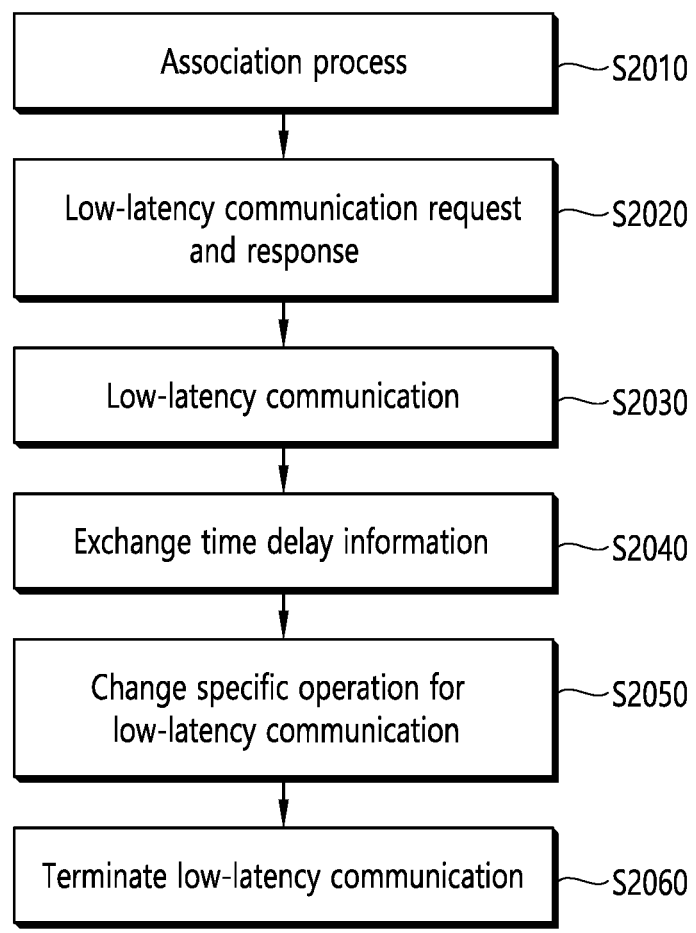
FIG. 20 is a flowchart illustrating an operation for performing low-latency communication.

FIG. 20 is a flowchart illustrating an operation for performing low-latency communication.

Referring to FIG. 20, an AP and a STA may perform operations S2010 to S2060. Some of the operations may not be essential. Accordingly, some operations may be omitted. Further, since the order of the operations is exemplary, the order in which the operations are performed may vary. In addition, only one of the operations may have independent technical meaning.

In S2010, the AP and the STA may perform an association process. Specifically, the AP and the STA may exchange information on a low-latency function. The information on the low-latency function may include information on whether to support a low-latency communication function.

In S2020, the AP and the STA may transmit and receive a low-latency communication request frame and may transmit and receive a low-latency communication response frame. For example, uplink traffic may occur in the STA. The STA may request the AP to perform low-latency communication based on the uplink traffic. That is, the STA may transmit a low-latency communication request frame to the AP. The AP may transmit a low-latency communication response frame to the STA based on the low-latency communication request frame.

In another example, downlink traffic may occur in the AP. The AP may transmit information indicating that the AP performs low-latency communication to the STA based on the downlink traffic. That is, the AP may transmit a low-latency communication request frame to the STA. The STA may transmit a low-latency communication response frame to the AP based on the low-latency communication request frame. In the case of downlink traffic, even though the STA does not transmit a low-latency communication response frame to the AP, the AP and the STA may perform low-latency communication.

In S2030, the AP and the STA may exchange time delay information (or information on a time delay). The AP and the STA may exchange time delay information on current traffic while low-latency communication is performed. For example, the AP and the STA may exchange a time delay state of the current traffic. The AP and the STA may periodically exchange the time delay information, or may exchange the time delay information when needed.

In S2040, the AP and the STA may change a specific operation for the low-latency communication. The AP and the STA may change or maintain the specific operation for the low-latency communication based on a current time delay.

In S2050, the AP and the STA may terminate the low-latency communication. The AP and the STA may request and respond to termination of the low-latency communication based on the traffic transmitted through the low-latency communication being entirely transmitted.

Hereinafter, specific operations of the AP and the STA may be described with respect to an operation of FIG. 20.
(1) Association Process for Low-Latency Communication The following technical feature may be related to S2010. For example, the following technical feature may be used in a process of performing S2010. Alternatively, the following technical feature may be performed in an operation other than S2010.

The AP supporting the low-latency communication function may include the information on whether to support the low-latency communication function in a beacon frame or a probe response frame. Subsequently, the AP may transmit the beacon frame or the probe response frame. The information on whether to support the low-latency communication function may be included in an EHT capability information element field.

FIG. 21 illustrates an example of an EHT capability information element field configuration.

Referring to FIG. 21, an EHT capability information element field 2100 may include a multi-band support field 2110, a low latency support field 2120, a 16-stream support field 2130, or a 320 MHz support field 2140. The EHT capability information element field may include capability information on main techniques applied in EHT. The EHT capability information element field 2100 and the specific field names of the detailed fields included in the EHT capability information element field 2100 may be changed.

For example, the low latency support field 2120 may include capability information on a technique related to low-latency communication of the STA or AP. For example, the STA may transmit a frame (or PPDU) including the EHT capability information element field 2100 to the AP. The STA may transmit information indicating that the STA can support low-latency communication to the AP through the EHT capability information element field 2100. The AP may also transmit information indicating that the AP can support low-latency communication to the STA through the EHT capability information element field 2100.

(2) Low-Latency Communication Request and Response Process

The following technical feature may be related to S2020. For example, the following technical feature may be used in a process of performing S2020. Alternatively, the following technical feature may be performed in an operation other than S2020.

When traffic (e.g., traffic sensitive to a time delay) occurs, the STA and the AP may exchange information on the traffic. For example, the STA and the AP may exchange the information on the traffic through a traffic specification (TSPEC) element field. The STA and the AP may exchange information related to a low-latency communication technology together with the information on the traffic.

FIG. 22 illustrates an example of a TSPEC element field configuration.

Referring to FIG. 22, at least one field among subfields of a TSPEC element field 2200 may be used to exchange information on traffic. For example, the TSPEC element field 2200 may include a plurality of subfields for the information on the traffic. A field related to a time delay among the plurality of subfields for the information on the traffic may be a delay bound field. The delay bound field may include information on a maximum allowable time delay value. Additionally, the delay bound field may further include information on a mean delay or a worst-case delay.

According to an embodiment, the information on the traffic may be included in a field other than the delay bound field. For example, a TS info field may include the information on the traffic. In one example, 1 bit of the traffic stream (TS) info field may include the information on the traffic.

According to an embodiment, a mean delay field may be further defined in addition to the delay bound field. The mean delay field may include information on both the maximum allowable time delay value and a mean time delay value.

According to an embodiment, when transmitting and receiving traffic sensitive to a time delay, it is important to consider a time delay jitter value. Therefore, in FIG. 23, a method of adding a field including information on a time delay jitter value to the TSPEC element field may be proposed. Additionally, a method of adding a field including packet loss requirement information to the TSPEC element field may be proposed.

FIG. 23 illustrates another example of a TSPEC element field configuration.

Referring to FIG. 23, a TSPEC element field 2300 may further include a delay jitter field 2310 and/or a required packet loss field 2320 in addition to the TSPEC element field 2200 of FIG. 22.

Specifically, for time delay-sensitive traffic (i.e., latency-critical traffic), delay bound information (i.e., a maximum allowable time delay value) of the TSPEC field 2300 may be an important indicator. In addition, a delay jitter value required for the traffic and a probability that a specific packet is lost after a maximum allowable time delay value may also be important performance indicators for the traffic. Accordingly, the delay jitter value and a required packet loss value for the traffic may be added to the TSPEC element field 2310. That is, the delay jitter field 2310 may include information on the delay jitter value. The required packet loss field 2320 may include information on the required packet loss value. That is, the required packet loss field 2320 may include information on the probability that the specific packet is lost after the maximum allowable time delay value.

Hereinafter, an example in which a STA and an AP exchange information on traffic may be described. For example, the STA may transmit a low-latency communication request frame. The AP may transmit a low-latency communication response frame.

The low-latency communication request frame may include first information for performing low-latency communication. The first information may include at least one of information for requesting a parameter for the low-latency communication and information on traffic. The low-latency communication response frame may include second information for performing the low-latency communication. The second information may include information about a parameter for the low-latency communication. Subsequently, the STA and the AP may perform the low-latency communication based on the first information and the second information.

The foregoing operations of exchanging the information on the traffic and performing the low-latency communication may be described with reference to FIG. 24.

Figure 24:
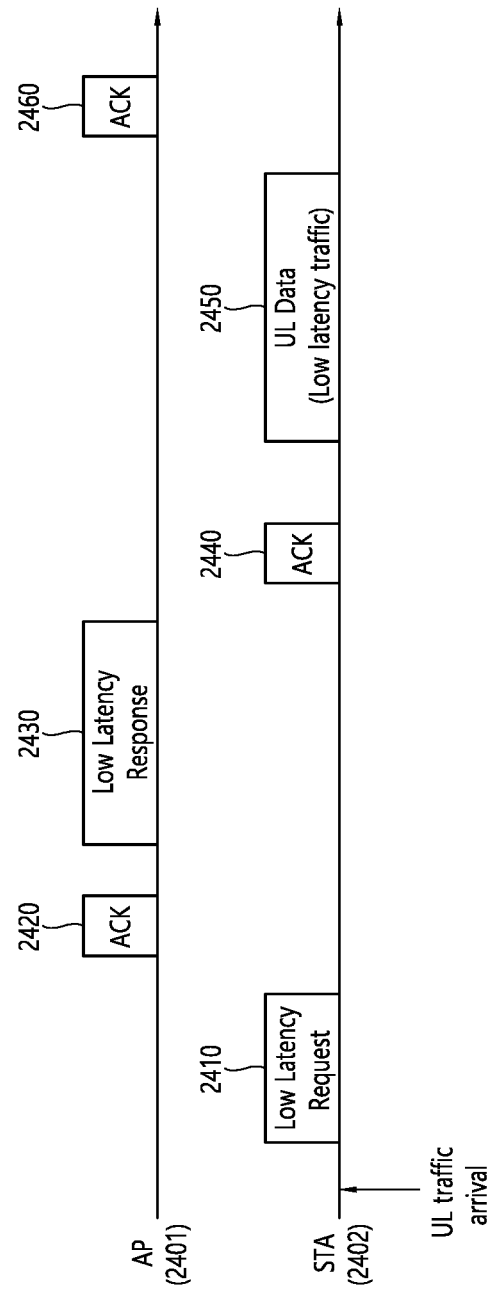
FIG. 24 illustrates an example of a low-latency communication request and response process.

FIG. 24 illustrates an example of a low-latency communication request and response process.

Referring to FIG. 24, after an AP 2401 and a STA 2402 exchange information on whether to support a low-latency communication function, low-latency traffic may occur. FIG. 24 illustrates an embodiment in a case where uplink traffic occurs. Even when downlink traffic occurs, the AP 2401 and the STA 2402 may operate similarly.

According to an embodiment, the uplink traffic may occur/arrive in the STA 2402. The STA 2402 may request a low-latency operation through a low-latency request frame 2410 including information on the traffic. The AP 2401 may receive the low-latency request frame 2410 from the STA 2402. The AP 2401 may transmit an ACK frame 2420 to the STA 2402 in response to the low-latency request frame 2410.

The AP 2401 may transmit a low-latency response frame 2430 including information on low-latency communication to be operated by the STA 2402 to the STA 2402. The STA 2402 may receive the low-latency response frame 2430. The STA 2402 may transmit an ACK frame 2440 to the AP 2401 in response to the low-latency response frame 2430.

The AP 2401 and the STA 2402 may perform low-latency communication based on the low-latency request frame 2410 and the low-latency response frame 2430. According to an embodiment, when downlink traffic occurs, the AP 2401 may transmit a low-latency request frame 2410 to the STA 2430. Here, transmission of a low-latency response frame 2430 by the STA 2402 may be omitted.

Hereinafter, the present specification describes an embodiment in which a STA transmits uplink data using an EDCA parameter rather than a MU EDCA parameter in order to perform low-latency communication. In detail, an uplink data transmission method based on an operating mode (OM) control field, a problem occurring in latency-sensitive traffic transmission, and a solution thereto may be described. According to the solution, to transmit time delay-sensitive data, the STA may transmit the data using an EDCA parameter, rather than a MU EDCA parameter, based on a specified condition.

An operating mode function is defined in IEEE 802.11ax. The STA and/or the AP may determine a reception/transmission mode thereof. The STA and/or the AP may transmit information on the determined mode. The STA and/or AP may perform transmission/reception based on the determined mode. For the operating mode function, an operating mode (OM) control field may be defined.

Figure 25:
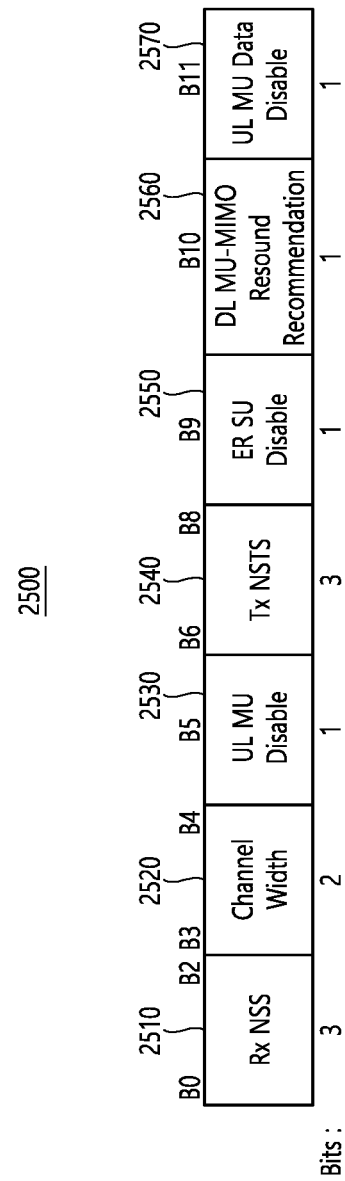
FIG. 25 illustrates an example of an OM control field.

FIG. 25 illustrates an example of an OM control field.

Referring to FIG. 25, the OM control field 2500 may include an Rx NSS subfield 2510, a channel width subfield 2520, a UL MU disable subfield 2530, a Tx NSTS subfield 2540, an ER SU disable subfield 2550, a DL MU-MIMO resound recommendation subfield 2560, and/or a UL MU data disable subfield 2570.

For example, when an operating channel bandwidth of the STA is greater than 80 MHz, the Rx NSS subfield 2510 may include information on the maximum number of spatial streams. The channel width subfield 2520 may include information on an operating channel bandwidth supported by the STA. The Tx NSTS subfield 2540 may include information on the maximum number of space-time streams. The ER SU disable subfield 2550 may include information on whether a 242-tone HE ER SU PPDU can be received. The DL MU-MIMO resound recommendation subfield 2560 may include information for the STA to suggest channel re-sounding to the AP or to suggest increasing a channel sounding frequency.

According to an embodiment, illustrative operations of the STA and AP based on the values of the UL MU disable subfield 2530 and the UL MU data disable subfield 2570 may be related to Table 5.

TABLE 5

| UL MU Disable subfield | UL MU Data Disable subfield | Interpretation by an AP that transmits a value of 0 in the OM control UL MU Data Disable RX support | Interpretation by an AP that transmits a value of 1 in the OM Control UL MU Data Disable RX Support |
|---|---|---|---|
| 0 | 0 | All trigger based UL MU transmissions are enabled by the STA. | All trigger based UL MU transmissions are enabled by the STA. |

TABLE 5-continued

| UL MU Disable subfield | UL MU Data Disable subfield | Interpretation by an AP that transmits a value of 0 in the OM control UL MU Data Disable RX support | Interpretation by an AP that transmits a value of 1 in the OM Control UL MU Data Disable RX Support |
|---|---|---|---|
| 0 | 1 | N/A | Trigger based UL MU Data frame transmissions in response to a Basic Trigger frame are suspended by the STA. Other trigger based UL MU transmissions remain enabled by the STA. |
| 1 | 0 | All trigger based UL MU transmissions are suspended by the STA. The STA will not respond to a received Trigger frame or MPDU containing a TRS Control subfield. | All trigger based UL MU transmissions are suspended by the STA. The STA will not respond to a received Trigger frame or MPDU containing a TRS Control subfield. |
| 1 | 1 | Reserved | Reserved |

Referring to Table 5, the STA may set the value of the UL MU disable subfield 2530 of the OM control field 2500 to a first value (e.g., 1). The STA may transmit the OM control field 2500 to the AP. Upon receiving the OM control field 2500, the AP may identify that the value of the UL MU disable subfield 2530 is the first value (e.g., 1). The AP may not allocate a UL MU resource to the STA based on the value of the UL MU disable subfield 2530 being the first value.

Instead of giving up being allocated a UL MU resource for UL transmission, the STA may use an enhanced distributed channel access (EDCA) parameter (or an EDCA parameter set) rather than a MU EDCA parameter (or a MU EDCA parameter set). For example, the STA may perform carrier-sense multiple access with collision avoidance (CSMA-CA) based on the EDCA parameter. Subsequently, the STA may transmit uplink data.

The MU EDCA parameter and the EDCA parameter may refer to a set of parameters related to an access category. That is, the MU EDCA parameter and the EDCA parameter may include various values (or parameters) related to AC_VO (voice), AC_VI (video), AC_BE (best effort), and/or AC_BK (background) rather than a single value. For example, the EDCA parameter may include CWmin, CWmax, AIFSN and/or TXOP limit values associated with AC_VO, AC_VI, AC_BE, and/or AC_BK.

Hereinafter, for convenience of description, an EDCA parameter set may be referred to as an EDCA parameter. Likewise, a MU EDCA parameter set may be referred to as a MU EDCA parameter.

Generally, when the MU EDCA parameter is used, the AP may set the MU EDCA parameter to make it more difficult for the STA to obtain a transmission opportunity than when the EDCA parameter is used. Therefore, instead of giving up being allocated the UL MU resource (i.e., setting the value of the UL MU disable subfield 2530 to the first value (e.g., 1)), the STA may use the EDCA parameter, thereby partly guaranteeing fairness in transmitting UL data.

Referring to a specific example, a first STA may be allocated a UL MU resource based on a trigger frame. The first STA may transmit uplink data based on the UL MU resource. The first STA may also transmit uplink data based on channel contention. However, a second STA may give up allocation of a UL MU resource. The second STA may transmit uplink data only through channel contention.

Since the first STA has more uplink data transmission opportunities than the second STA, the AP may set different parameters to be used in the first STA and the second STA. For example, when the first STA performs channel access (or channel contention), the AP may set the first STA to use a MU EDCA parameter. When the second STA performs channel access (or channel contention), the AP may set the second STA to use an EDCA parameter. Thus, parameters used for the first STA and the second STA in channel access (or channel contention) may be differently set, thereby guaranteeing fairness.

Hereinafter, examples of an EDCA parameter and a MU EDCA parameter may be described. Table 6 may be an example of an EDCA parameter. For example, Table 6 may be a default EDCA parameter defined in IEEE 802.11-2016. Table 7 may be an example of a MU EDCA parameter. The default value of the MU EDCA parameter may be variously set. For example, the default value of the MU EDCA parameter may be set larger than that of the EDCA parameter.

TABLE 6

| AC | CWmin | CWmax | AIFSN | TXOP Limit |
|---|---|---|---|---|
| AC_BK | 15 | 1023 | 7 | 2.528 ms |
| AC_BE | 15 | 1023 | 3 | 2.528 ms |
| AC_VI | 7 | 15 | 2 | 4.096 ms |
| AC_VO | 3 | 7 | 2 | 2.080 ms |

TABLE 7

| AC | CWmin | CWmax | AIFSN | TXOP Limit |
|---|---|---|---|---|
| MU AC_BK | 127 | 1023 | 23 | 0 ms |
| MU AC_BE | 127 | 1023 | 5 | 0 ms |
| MU AC_VI | 31 | 63 | 4 | 4.096 ms |
| MU AC_VO | 15 | 31 | 4 | 2.080 ms |

Referring to Table 6 and Table 7, an EDCA parameter set may include information on a channel access parameter (e.g., AIFS, CWmin, CWmax, and TXOP limit) for each access category (AC). Smaller AIFS, CWmin, and/or CWmax values have a higher priority, and accordingly a channel access delay is reduced, enabling more bands to be used in a given traffic environment.

For example, a CWmin value of a MU EDCA parameter may be set to be larger than a CWmin value of an EDCA parameter. A CWmax value of the MU EDCA parameter may be set to be larger than a CWmax value of the EDCA parameter. An AIFSN value of the MU EDCA parameter may be set to be larger than an AIFSN value of the EDCA parameter. That is, when the CWmin, CWmax, and AIFSN values are set to be larger, the STA may have difficulty in obtaining a channel. Accordingly, the STA may have difficulty in transmitting data.

Referring back to Table 5, the STA may set/determine whether to allow a UL MU operation based on the UL MU data disable subfield 2570. For example, the STA may allow a UL MU operation for transmission of a management frame or a control frame excluding UL data transmission based on the UL MU data disable subfield 2570. Accordingly, the STA may not allow only UL data transmission based on the UL MU data disable subfield 2570.

Problems Occurring in Transmitting Latency-Sensitive Traffic

Hereinafter, in the present specification, transmission of time delay (or latency)-sensitive traffic and UL transmission may be assumed. The AP and the STA may be in a state of having exchanged the OM control field. Specifically, it may be assumed that a UL MU resource is set to be allocated to the STA by the AP and the STA setting the UL MU disable field to a second value (e.g., 0).

In this situation, since the STA and the AP have exchanged information on a required latency of the latency-sensitive traffic, the AP may allocate a UL MU resource to the STA according to an appropriate period. For example, the AP may change the period of a trigger frame based on the information on the required latency. Accordingly, the AP may receive the latency-sensitive traffic according to the required latency.

However, due to a change in a wireless channel environment, latency of UL QoS data to be transmitted by the STA may increase. The UL QoS data may include latency-sensitive data. For example, the UL QoS data may include data for which a delay value less than or equal to a threshold value is required. Hereinafter, various illustrative cases in which the latency of the UL QoS data increases may be described.

(1) Where the STA fails to receive the trigger frame transmitted by the AP: For example, when a collision by a hidden STA (or hidden terminal) occurs, the STA may not receive the trigger frame from the AP. In another example, when a channel condition suddenly deteriorates, the STA may not receive the trigger frame from the AP. When the STA fails to receive the trigger frame from the AP, the STA may not transmit the UL QoS data to the AP. When this case is repeated, the latency of the UL QoS data may increase.

(2) Where a channel state of the UL MU resource allocated from the AP is busy: For example, even though the STA normally receives the trigger frame from the AP, when the channel state of the allocated UL MU resource is busy, the STA may not transmit the UL QoS data.

For example, when a carrier sensing (CS) required field of the trigger frame is a first value (e.g., 1), the STA receiving the trigger frame may transmit the UL QoS data using the UL MU resource only when the channel state of the allocated UL MU resource is idle. Therefore, when the channel state of the UL MU resource is in busy, the STA cannot transmit the UL QoS data. When this case is repeated, the latency of the UL QoS data may increase.

(3) Where the STA transmits the UL QoS data using the UL MU resource but the transmission fails: For example, the STA may normally receive the trigger frame from the AP. The STA may be allocated the UL MU resource based on the trigger frame. However, the STA may transmit the UL QoS data through the allocated UL MU resource, but the AP may not receive the UL QoS data.

In one example, a collision by a hidden STA (or hidden terminal) may occur in the AP. In another example, the AP may fail to receive the UL QoS data because the STA selects an inappropriate MCS. In still another example, the AP may fail to receive the UL QoS data because the condition of a channel through which the UL QoS data is transmitted deteriorates. When this case is repeated, the latency of the UL QoS data may increase.

(4) Where the STA is not allocated the UL MU resource from the AP at an appropriate time: Generally, the AP may allocate the UL MU resource to the STA every appropriate time (or every specified period). However, for example, the trigger frame may not be transmitted at an appropriate time (or a specified period) due to the channel state being busy or an internal problem of the AP. In another example, even though the trigger frame is transmitted, no resource may be allocated to the STA. For example, resources to be allocated to the STA may be insufficient or absent due to an increase in the number of resources to be allocated to other STAs or insufficient resources to allocate. When this case is repeated, the latency of the UL QoS data may increase.

When the foregoing cases (cases (1) to (4)) repeatedly occur, the latency of the UL QoS data to be transmitted by the STA may rapidly increase. It may be important for the latency-sensitive traffic (i.e., the UL QoS data) to be transmitted at an appropriate time. That is, for the latency-sensitive traffic, a delay value less than or equal to a threshold value may be required. However, when the STA fails to stably transmit the traffic in the foregoing cases, a method enabling the STA to urgently transmit the traffic may be required.

Solutions to Problems Occurring in Transmitting Latency-Sensitive Traffic

Various methods may be proposed to solve problems occurring in transmitting latency-sensitive traffic. For example, the following two methods may be proposed.

Method of adjusting a UL MU resource: For example, the AP may additionally allocate a UL MU resource that the STA can use in an emergency situation. However, the additionally allocated UL MU resource is not frequently used, thus causing resource waste.

Method of adjusting a UL contention method: Since the foregoing method of adjusting the UL MU resource incurs substantial resource waste, a method of adjusting a UL contention method may be proposed for efficient resource use.

Since the method of adjusting the UL MU resource may cause resource waste, it may be more effective to adjust the UL contention method. Accordingly, a specific method for adjusting the UL contention method may be described below.

According to a conventional standard, when being allocated a UL MU resource, the STA needs to use a MU EDCA parameter. However, the MU EDCA parameter is more unfavorable for the STA to obtain a transmission opportunity than an EDCA parameter. Therefore, the present specification may propose using an EDCA parameter rather than a MU EDCA parameter.

When the STA unconditionally uses an EDCA parameter, a problem in fairness may occur. Accordingly, the present specification may propose using an EDCA parameter only in a limited situation (or a specified condition) with the STA using a MU EDCA parameter as a default. According to an embodiment, the method of using the EDCA parameter only in the limited situation (or the specified condition) may be applied only to traffic agreed between the STA and the AP to support low latency rather than all access categories. For example, the method of using the EDCA parameter only in the limited situation (or the specified condition) may be applied only to traffic in access categories of AC_VI and AC_VO.

A specific example of the method of using the EDCA parameter only in the limited situation described above may be described with reference to FIG. 26 and FIG. 27.

Figure 26:
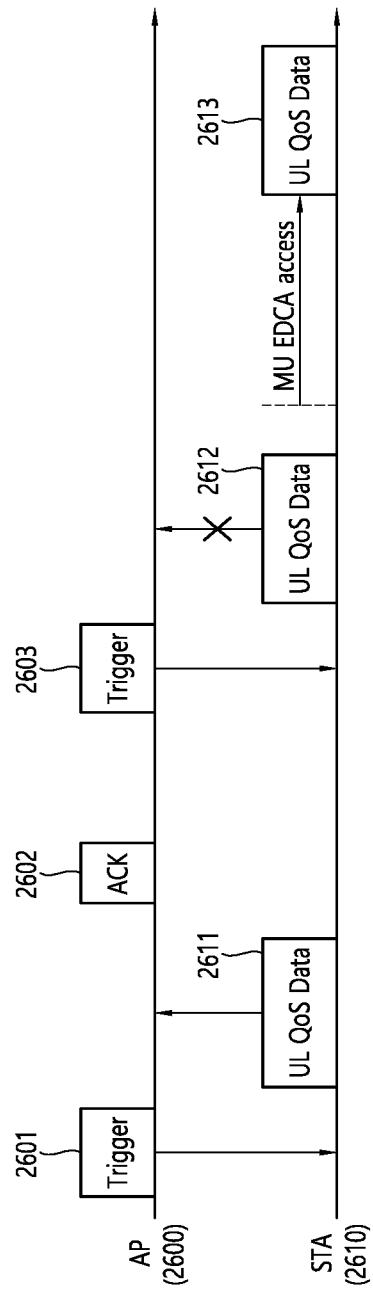
FIG. 26 illustrates an example in which a MU EDCA parameter is used.

FIG. 26 illustrates an example in which a MU EDCA parameter is used.

Referring to FIG. 26, an AP 2600 may transmit trigger frames 2601 and 2603 to receive data from a STA 2610. For example, the AP 2600 may periodically transmit the trigger frames 2601 and 2603.

According to an embodiment, the STA 2610 may receive the trigger frame 2601. The STA 2610 may transmit UL QoS data 2611 based on the trigger frame 2601. For example, the STA 2610 may be allocated a UL MU resource based on the trigger frame 2601. The STA 2610 may transmit the UL QoS data 2611 through the allocated UL MU resource. The AP 2600 may transmit an ACK frame 2602 in response to the UL QoS data 2611.

According to an embodiment, even though the STA 2610 receives the trigger frame 2603 from the AP 2600, UL QoS data 2612 may not be transmitted to the AP 2600. For example, an error may occur while transmitting the UL QoS data 2612. The AP 2600 may not receive the UL QoS data 2612. The STA 2610 may not receive an ACK frame in response to the UL QoS data 2612. In this case, the STA 2610 may perform a MU EDCA access process. For example, the MU EDCA access process may refer to a process of performing channel access using a MU EDCA parameter. The STA 2610 may transmit UL QoS data 2613 related to the UL QoS data 2612. For example, the UL QoS data 2613 may include the same information as the UL QoS data 2612.

That is, the STA 2610 may transmit the UL QoS data 2613 to the AP 2600 after performing the MU EDCA access process in order to transmit the UL QoS data 2613 within a required latency.

Figure 27:
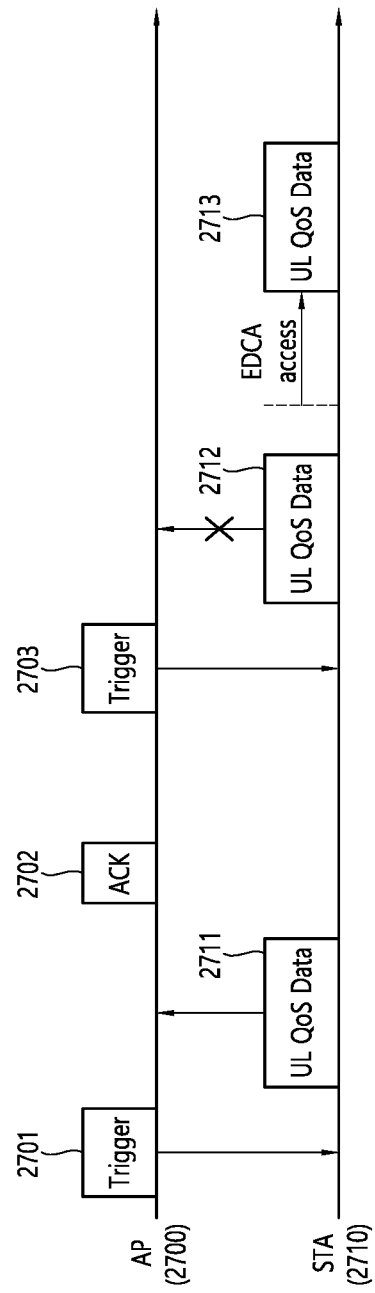
FIG. 27 illustrates an example in which an EDCA parameter is used.

FIG. 27 illustrates an example in which an EDCA parameter is used.

Referring to FIG. 27, an AP 2700 may transmit trigger frames 2701 and 2703 to receive data from a STA 2710. For example, the AP 2700 may periodically transmit the trigger frames 2701 and 2703.

An operation in which the AP 2700 transmits the trigger frame 2701 and receives UL QoS data 2711 may be related to an operation illustrated in FIG. 26. The AP 2700 may transmit an ACK frame 2702 in response to the UL QoS data 2711.

According to an embodiment, even though the STA 2710 receives the trigger frame 2703 from the AP 270, UL QoS data 2712 may not be transmitted to the AP 2700. For example, an error may occur while transmitting the UL QoS data 2712. The AP 2700 may not receive the UL QoS data 2712. The STA 2710 may not receive an ACK frame in response to the UL QoS data 2712. In this case, the STA 2710 may perform an EDCA access process. For example, the EDCA access process may refer to a process of performing channel access using an EDCA parameter.

The STA 2710 may transmit UL QoS data 2713 related to the UL QoS data 2712. For example, the UL QoS data 2713 may include the same information as the UL QoS data 2712.

That is, the STA 2710 may transmit the UL QoS data 2713 to the AP 2700 after performing the EDCA access process in order to transmit the UL QoS data 2713 within a required latency.

While the MU EDCA parameter may be used to perform channel access in FIG. 26, the EDCA parameter may be used to perform channel access in FIG. 27. The STA 2700 may quickly transmit the UL QoS data 2713 to the AP 2700 through EDCA rather than MU EDCA.

For example, latency-critical traffic may be generally related to access categories of AC_VI and AC_VO. In one example, the STA 2710 may transmit traffic included in the access categories of AC_VI and AC_VO through EDCA. Specifically, for latency-critical traffic related to a video and/or voice, the STA 2710 may perform channel access (or channel contention) using an EDCA parameter rather than an MU EDCA parameter, thereby quickly transmitting the traffic to the AP 2700. That is, the STA 2710 may perform channel access more quickly through EDCA than through MU EDCA.

Conditions and Rules for Using EDCA Parameter Rather than MU EDCA Parameter

Various conditions and rules for the STA to use an EDCA parameter rather than a MU EDCA parameter while being allocated a UL MU resource may be set. To use the EDCA parameter, at least one of the following conditions and rules may be used.

1. Conditions

1-A. Where latency of UL QoS data to be transmitted is close to a required latency: The STA and the AP may determine a threshold value by agreement based on the required latency. When the latency of the UL QoS data to be transmitted exceeds the threshold value, the STA may attempt EDCA access.

1-B. Where pieces of UL QoS data transmitted for a specified time have poor latency performance: The STA may measure the mean latency or the jitter value of currently transmitted traffic. When the mean latency or the jitter value reaches a certain level, the STA may attempt EDCA access. That is, when the mean latency or the jitter value exceeds a threshold value, the STA may attempt EDCA access. A specific threshold value may be determined by discussion/ agreement between the STA and the AP.

1-C. Where the STA continuously fails in transmissions of UL QoS data transmitted using the UL MU resource 1-D. Where the STA has not received a trigger frame for allocating a UL MU resource from the AP for a certain time 1-E. Where the STA continuously fails to receive a trigger frame from the AP Only when some or all of the foregoing conditions 1-A to 1-E are satisfied, the STA may use the EDCA parameter rather than the MU EDCA parameter. The foregoing conditions may be agreed between the AP and the STA.

2. Rules

2-A. The STA may not be allowed to use the EDCA parameter rather than the MU EDCA parameter in conditions other than the foregoing conditions (i.e., conditions 1-A to 1-E).

2-B. When using the EDCA parameter, the STA can transmit only QoS data. For example, using the EDCA parameter, the STA cannot transmit a management frame or a control frame and may need to transmit only time delay-sensitive data.

2-C. The STA may receive a trigger frame during channel contention (or channel access) using the EDCA parameter. The STA may transmit UL QoS data through the UL MU resource based on the trigger frame. After successfully transmitting the UL QoS data without an error, the STA may need to perform MU EDCA access until the foregoing conditions (i.e., conditions of 1-A to 1-E) are satisfied again.

2-D. When transmitting UL QoS data using the EDCA parameter, the STA may add a field indicating that the UL QoS data is transmitted using the EDCA parameter rather than the MU EDCA parameter to a frame including the UL QoS data. The AP receiving the frame may identify that the frame including the UL QoS data is received using the EDCA parameter rather than the MU EDCA parameter.

When the EDCA parameter is used based on the foregoing conditions and rules, there are various effects.

For example, a wireless channel condition may drastically change. Accordingly, latency of UL QoS data may suddenly increase due to the channel condition or the like. According to an embodiment of the present specification, it is possible to alleviate a sudden increase in the latency.

In another example, a resource does not need to be allocated in advance in order to prevent a sudden increase in latency of UL QoS data, thus not wasting a resource.

According to an embodiment, the AP may not use the EDCA parameter set as a default as it is. The AP may set a second EDCA parameter that is distinct from the EDCA parameter and/or the MU EDCA parameter. The AP may transmit the second EDCA parameter to the STA. The STA may use the second EDCA parameter rather than the MU EDCA parameter based on the foregoing conditions.

Information Transmitted by AP to STA

According to an embodiment, the AP may transmit a probe response frame, an association response frame, and/or a beacon frame including various pieces of information. According to an embodiment, the AP may include various pieces of information in an OM control field and may exchange the OM control field with the STA. Examples of the various pieces of information may be described below. According to an embodiment, the various pieces of information may be included in a MAC frame.

1. Information on whether a transmission method using an EDCA parameter rather than a MU EDCA parameter is allowed (hereinafter, first information): The AP may transmit information on whether the foregoing embodiment is supported to the STA. For example, the AP may transmit information on whether a transmission method using an EDCA parameter rather than a MU EDCA parameter is supported to the STA based on a specified condition.

According to an embodiment, when the first information is set to TRUE (or a first value), the AP may instruct the STA to use the EDCA parameter or a second EDCA parameter rather than the MU EDCA parameter in the specified condition even though the STA is allocated a UL MU resource. The STA may transmit UL data (or UL QoS data) through the EDCA parameter or the second EDCA parameter based on the first information.

According to an embodiment, when the first information is set to FALSE (or a second value), the AP may instruct the STA to use the MU EDCA parameter without exception when the STA is allocated a MU UL resource. The STA may transmit UL data (or UL QoS data) through the MU EDCA parameter based on the first information.

2. Information on an operation method when an EDCA parameter is used rather than a MU EDCA parameter (hereinafter, second information): The AP may transmit information on a specific operation method related to the foregoing transmission method to the STA. For example, the AP may arbitrarily select one of two general operation methods and may transmit information on the selected operation method to the STA. Examples of the two operation methods may be described below. Specifically, 2-a may be an operation method using an EDCA parameter, and 2-b may be an operation method using a separate EDCA parameter (second EDCA parameter) that is distinct from the EDCA parameter.

2-a. Information on use of an EDCA parameter: The STA may use the EDCA parameter rather than the MU EDCA parameter under the specified condition. The EDCA parameter may be included in the probe response frame, the association response frame, the beacon frame, and the like. That is, the AP transmits/receive information indicating that the EDCA parameter can be used rather than the MU EDCA parameter under the specified condition through the probe response frame, the association response frame, the beacon frame, and the like.

According to an embodiment, the AP may transmit information indicating that the EDCA parameter can be applied only to a specified access category to the STA. When traffic (or data) included in at least one of the four access categories is transmitted, the AP may transmit information indicating that the EDCA parameter can be used to the STA. For example, when traffic included in the access categories of AC_VI and AC_VO is transmitted, the AP may transmit information indicating that the EDCA parameter can be used to the STA.

2-b. Information on whether a separate EDCA parameter (second EDCA parameter) is used: According to an embodiment, the STA may use a separate EDCA parameter (second EDCA parameter) rather than the MU EDCA parameter under a specified condition. The separate EDCA parameter (second EDCA parameter) may be referred to as a latency EDCA parameter. The latency EDCA parameter may be different from the foregoing default EDCA parameter. Accordingly, the AP may transmit information on the latency EDCA parameter to the STA. For example, the AP may transmit information on whether to use the latency EDCA parameter and/or a specific value of the latency EDCA parameter to the STA.

For example, the specific value of the latency EDCA parameter may include AIFSn, CWmin, CWmax, and TXOP limit values. The AP may transmit a plurality of sets of specific values of the latency EDCA parameter based on a latency requirement in order to prioritize traffic.

3. Information on a condition in which an EDCA parameter is used rather than a MU EDCA parameter (hereinafter, third information): The AP may transmit information on a specific condition for using the foregoing transmission method to the STA. For example, the AP may transmit information on the foregoing conditions 1-A to 1-E to the STA. In one example, the AP may transmit, to the STA, information indicating that the EDCA parameter or the latency EDCA parameter is used only when at least one of the foregoing conditions is satisfied. That is, the AP may transmit information on at least one condition in which the EDCA parameter (or latency EDCA parameter) is used rather than the MU EDCA parameter to the STA. The STA may use either the EDCA parameter or the latency EDCA parameter based on the third information.

Information Transmitted by STA to AP

According to an embodiment, the STA may transmit a probe request frame and/or a probe request frame including various pieces of information. According to an embodiment, the STA may include various pieces of information in an OM control field and may exchange the OM control field with the AP. Examples of the various pieces of information may be described below. According to an embodiment, the various pieces of information may be included in a MAC frame.

1. Information on whether a transmission method using an EDCA parameter rather than a MU EDCA parameter is used (hereinafter, fourth information): The STA may transmit information on whether the foregoing embodiment is supported to the AP. For example, the STA may transmit information on whether a transmission method using an EDCA parameter rather than a MU EDCA parameter is supported to the AP based on a specified condition.

According to an embodiment, when the fourth information is set to TRUE (or a first value), the STA may use the EDCA parameter or a second EDCA parameter rather than the MU EDCA parameter in the specified condition even though being allocated a UL MU resource. The STA may transmit UL data (or UL QoS data) through the EDCA parameter or the second EDCA parameter based on the fourth information.

According to an embodiment, when the fourth information is set to FALSE (or a second value), the STA may use the MU EDCA parameter without exception when being allocated a MU UL resource. The STA may transmit UL data (or UL QoS data) through the MU EDCA parameter based on the fourth information.

2. Information on an operation method when an EDCA parameter is used rather than a MU EDCA parameter (hereinafter, fifth information): The STA may transmit information on a specific operation method related to the foregoing transmission method to the AP. For example, the STA may arbitrarily select one of two general operation methods and may transmit information on the selected operation method to the AP. The fifth information may be transmitted to the AP only when the STA can select/determine one of the two operation methods. Examples of the two operation methods may be described below. Specifically, 2-a may be an operation method using an EDCA parameter, and 2-b may be an operation method using a separate EDCA parameter (second EDCA parameter) that is distinct from the EDCA parameter.

2-a. Information on use of an EDCA parameter: The STA may use the EDCA parameter rather than the MU EDCA parameter under the specified condition. The EDCA parameter may be included in the probe response frame, the association response frame, the beacon frame, and the like. That is, the AP transmits/receive information indicating that the EDCA parameter can be used rather than the MU EDCA parameter under the specified condition through the probe response frame, the association response frame, the beacon frame, and the like.

According to an embodiment, the AP may transmit information indicating that the EDCA parameter can be applied only to a specified access category to the STA. When traffic (or data) included in at least one of the four access categories is transmitted, the AP may transmit information indicating that the EDCA parameter can be used to the STA. For example, when traffic included in the access categories of AC_VI and AC_VO is transmitted, the AP may transmit information indicating that the EDCA parameter can be used to the STA.

2-b. Information on whether a separate EDCA parameter (second EDCA parameter) is used: The STA may use a separate EDCA parameter received from the AP. The separate EDCA parameter (second EDCA parameter) may be referred to as a latency EDCA parameter.

3. Information on a condition in which an EDCA parameter is used rather than a MU EDCA parameter (hereinafter, sixth information): The STA may transmit information on a specific condition for using the foregoing transmission method to the AP. For example, the STA may transmit information on the foregoing conditions 1-A to 1-E to the AP. In one example, the STA may transmit, to the AP, information indicating that the EDCA parameter or the latency EDCA parameter is used only when at least one of the foregoing conditions is satisfied. The sixth information may be transmitted only when the STA can select the specific condition for using the foregoing transmission method.

According to the foregoing embodiment, in a case where the STA transmits UL QoS data after receiving a trigger frame but does not receive an ACK, an operation of the STA to satisfy a required latency may be described below.

Figure 28:
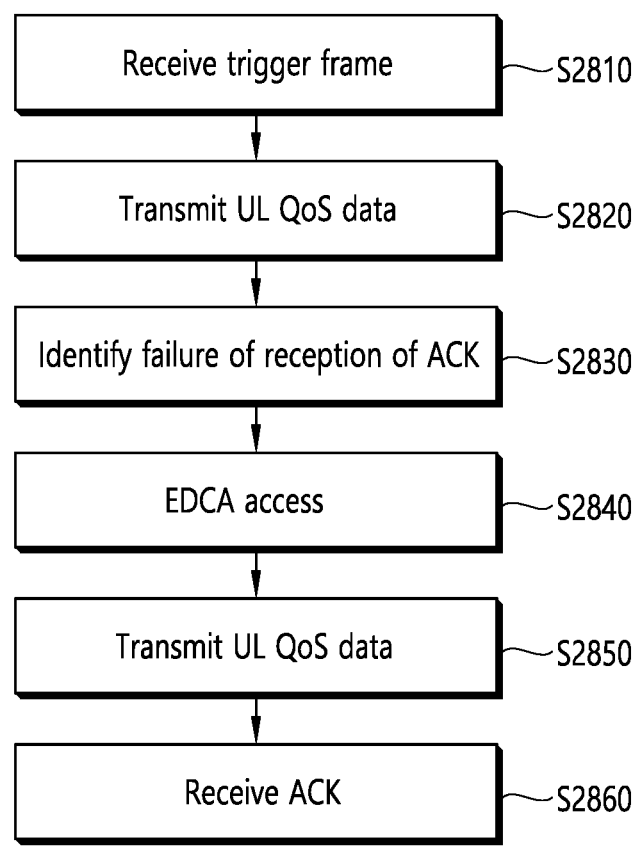
FIG. 28 is a flowchart illustrating an operation of a STA.

FIG. 28 is a flowchart illustrating an operation of a STA.

Referring to FIG. 28, in S2810, the STA (e.g., the STA 2710) may receive a trigger frame. The STA may receive the trigger frame from an AP (e.g., the AP 2700) every specified period. The STA may be allocated a UL MU resource based on the trigger frame.

In S2820, the STA may transmit UL QoS data to the AP. For example, the STA may transmit the UL QoS data through the UL MU resource allocated by the AP. For example, UL QoS data may include latency-sensitive data. For example, the UL QoS data may include data for which a delay value less than or equal to a threshold value is required.

In S2830, the STA may identify that reception of an ACK frame from the AP has failed. After transmitting the UL QoS data, the STA may wait to receive the ACK frame from the AP after a specified time (e.g., SIFS). The STA may identify that the ACK frame has not been received after the specified time. The STA may identify that the UL QoS data has not been properly transmitted to the AP based on the ACK frame not being received.

In S2840, the STA may perform an EDCA process to retransmit the UL QoS data to the AP. The EDCA process may refer to a process of performing channel access (or channel contention) using an EDCA parameters. The STA may transmit the UL QoS data to the AP early using the EDCA parameter rather than a MU EDCA parameter.

According to an embodiment, when a specified condition is satisfied, the STA may perform the EDCA process rather than MU EDCA.

For example, the specified condition may include a case where latency of UL QoS data to be transmitted is close to a required latency, a case where UL QoS data transmitted for a specified time has poor latency performance, a case where transmissions of UL QoS data transmitted using the UL MU resource continuously fail, a case where a trigger frame for allocating a UL MU resource is not received from the AP for a predetermined time, and/or a case where receptions of a trigger frame from the AP continuously fail.

In S2850, the STA may transmit the UL QoS data. For example, the STA may obtain a channel (or obtain a transmission opportunity) through S2840. Accordingly, the STA may transmit the UL QoS data to the AP based on the EDCA process.

In S2860, the STA may receive an ACK frame from the AP. The STA may receive an ACK frame in response to the UL QoS data.

Figure 29:
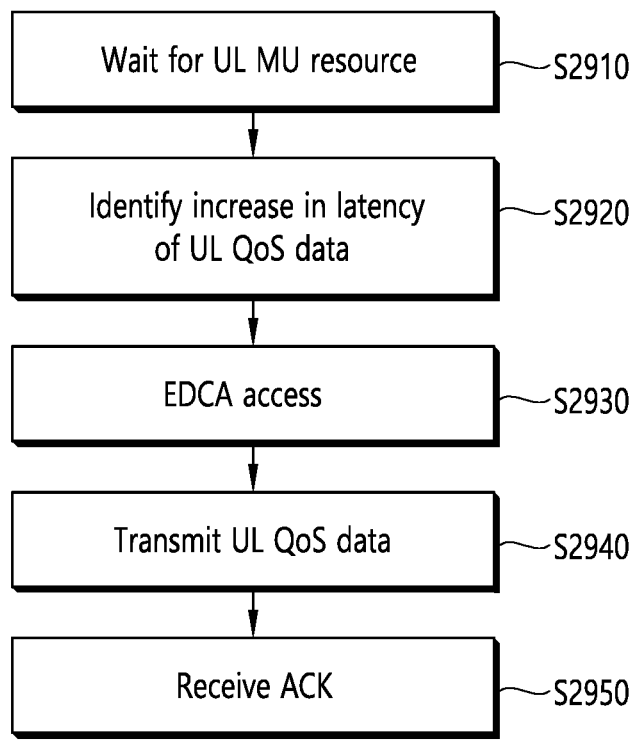
FIG. 29 is a flowchart illustrating another operation of an STA.

FIG. 29 is a flowchart illustrating another operation of an STA.

Referring to FIG. 29, in S2910, the STA may wait for a UL MU resource. After receiving a trigger frame from an AP, the STA may be allocated the UL MU resource based on the trigger frame. According to an embodiment, the STA may wait for allocation of the UL MU resource in order to transmit UL QoS data.

In S2920, the STA may identify an increase in latency of the UL QoS data. According to an embodiment, the STA may identify that the latency (or delay value) of the UL QoS data exceeds a predetermined value. The STA may use an EDCA parameter among a MU EDCA parameter and the EDCA parameter for channel access (or channel contention) based on the latency (or delay value) of the UL QoS data exceeding the predetermined value.

In S2930, the STA may perform an EDCA process. S2930 may be related to S2840 of FIG. 28.

In S2940, the STA may receive an ACK frame from the AP. S2940 may be related to S2850 of FIG. 28.

Figure 30:
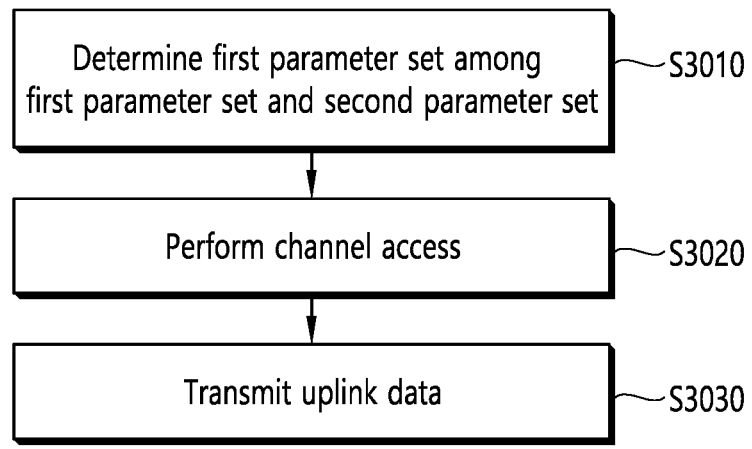
FIG. 30 is a flowchart illustrating still another operation of an STA.

FIG. 30 is a flowchart illustrating still another operation of an STA.

Referring to FIG. 30, in S3010, the STA may determine/select a first parameter set among the first parameter set and a second parameter set.

For example, the STA may determine the first parameter set among the first parameter set and the second parameter set based on a time delay value (or latency) of uplink data. The uplink data may include data for which a time delay value less than or equal to a threshold value (first value) is required.

In one example, the STA may determine the first parameter set among the first parameter set and the second parameter set based on the time delay value increasing due to failure of transmission of the uplink data. That is, the STA may receive a trigger frame from an AP. The STA may be allocated a UL MU resource based on the trigger frame. The STA transmits the uplink data through the allocated UL MU resource, but the transmission may fail. The STA may identify that the transmission has failed based on no ACK frame being received from the AP.

In one example, the STA may determine the first parameter set among the first parameter set and the second parameter set based on the time delay value increasing as a trigger frame for being allocated a UL MU resource is not received for a predetermined time.

In one example, the STA may determine the first parameter set among the first parameter set and the second parameter set based on the time delay value of the uplink data exceeding a predetermined value (second value). The predetermined value (second value) may be set to be different from the threshold value (first value). For example, the time delay value of the uplink data may need to be transmitted within the threshold value (first value). The threshold value may include a required latency. For example, when the time delay value of the uplink data exceeds the threshold value, the STA may not transmit the uplink data. In another example, the predetermined value may include a value for determining the first parameter set among the first parameter set and the second parameter set. For example, the predetermined value may be set to be smaller than the threshold value.

For example, the first parameter set may include a parameter set for EDCA. The second parameter set may include a parameter set for MU EDCA. In other words, the first parameter set may include an EDCA parameter set. The second parameter set may include a MU EDCA parameter set. In one example, the MU EDCA parameter set may be more unfavorable to obtain a transmission opportunity in channel access (or channel contention) than the EDCA parameter set.

For example, the first parameter set and the second parameter set may be related to an access category. The first parameter set may include information on a channel access parameter related to AC_BK (background), AC_BE (best effort), AC_VI (video), and/or AC_VO (voice). The channel access parameter may include AIFS, CWmin, CWmax, and/or a TXOP limit.

In one example, the first parameter set may include AIFS, CWmin, CWmax, and/or TXOP limit parameter information related to AC_BK. In another example, the first parameter set may include AIFS, CWmin, CWmax, and/or TXOP limit parameter information related to AC_BE. In still another example, the first parameter set may include AIFS, CWmin, CWmax, and/or TXOP limit parameter information related to AC_VI. In yet another example, the first parameter set may include AIFS, CWmin, CWmax, and/or TXOP limit parameter information related to AC_VO.

According to an embodiment, the STA may receive information on the first parameter set and/or information on the second parameter set from the AP. The STA may obtain information on a specific parameter value included in the first parameter set from the AP. The STA may obtain information on a specific parameter value included in the second parameter set from the AP.

In S3020, the STA may perform channel access. For example, the STA may perform the channel access based on the first parameter set. In one example, the STA may perform channel the access through the first parameter set, thereby obtaining a channel (or transmission opportunity) for transmitting the uplink data faster than when performing channel access through the second parameter set.

In S3030, the STA may transmit the uplink data to an access point (AP). For example, the STA may transmit the uplink data to the AP based on the channel access. For example, the uplink data may include data for which the time delay value (or latency) less than or equal to the threshold value is required. Accordingly, the STA may transmit the uplink data to the AP based on the first parameter set, thereby satisfying the time delay value of the uplink data to be less than or equal to the threshold value.

According to an embodiment, the STA may determine/select the second parameter set among the first parameter set and the second parameter set based on the time delay value of the uplink data not exceeding the predetermined value. The STA may perform channel access based on the second parameter and may transmit the uplink data. When the channel access is performed based on the second parameter, it may be more difficult to obtain a transmission opportunity than when channel access is performed based on the first parameter.

The foregoing technical features of the present specification may be applied to various devices and methods. For example, the foregoing technical features of the present specification may be performed/supported through the apparatus of FIG. 1 and/or FIG. 19. For example, the foregoing technical features of the present specification may be applied to only part of FIG. 1 and/or FIG. 19. For example, the foregoing technical features of the present specification may be implemented based on the processing chips 114 and 124 of FIG. 1, may be implemented based on the processors 111 and 121 and the memories 112 and 122 of FIG. 1, or may be implemented based on the processor 610 and the memory 620 of FIG. 19. For example, an apparatus of the present specification may include a processor and a memory connected to the processor, wherein the processor may be configured to determine a first parameter set among the first parameter set and a second parameter set based on a time delay value of uplink data, to perform channel access based on the first parameter set, and to transmit the uplink data to an access point (AP) based on the channel access.

The technical features of the present specification may be implemented based on a computer-readable medium (CRM). For example, the CRM proposed according to the present specification may store instructions to perform operations including determining a first parameter set among the first parameter set and a second parameter set based on a time delay value of uplink data, performing channel access based on the first parameter set, and transmitting the uplink data to an access point (AP) based on the channel access. The instructions stored in the CRM of the present specification may be executed by at least one processor. The least one processor related to the CRM of the present specification may be the processors 111 and 121 or the processing chips 114 and 124 of FIG. 1 or may be the processor 610 of FIG. 19. The CRM of the present specification may be the memories 112 and 122 of FIG. 1, may be the memory 620 of FIG. 19, or may be a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claim of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a station (STA) in a wireless local area network system, the method comprising:
   transmitting, to an access point (AP), a first frame including a first Operating Mode (OM) control field having a value of zero, wherein a value of the first OM control field is determined based on whether trigger-based uplink multi-user (UL MU) transmission are enabled by the STA;

in response to the first OM control field, receiving, from the AP, a second frame including a second OM control field to enable the trigger-based UL MU transmission;

receiving, from the AP, a trigger frame soliciting the trigger-based UL MU transmission;

in response to the trigger frame, transmitting, to the AP, a Trigger-Based (TB) Physical Protocol Data Unit (PPDU), wherein the TB PPDU includes a Legacy Signal (L-SIG) field, a Repeated Legacy Signal (RL-SIG) field which is contiguous to the L-SIG field, and a Universal Signal (U-SIG) field which is contiguous to the RL-SIG field, wherein the L-SIG field includes a length field which is set to a value satisfying a condition that a remainder is zero when the length field is divided by three, wherein the RL-SIG field is a repeat of the L-SIG field, wherein the U-SIG field includes three-bit information indicating a physical version of the TB PPDU, wherein the TB PPDU carries UL Quality of Service (QoS) data;

after determining that the TB PPDU is not successfully received by the AP, determining a type of an enhanced distributed channel access (EDCA) parameter based on a time delay value related to the UL QoS Data, wherein a type of EDCA parameter is determined to be an MU EDCA parameter based on the time delay value of the UL QoS data;

performing channel access based on the MU EDCA parameter; and transmitting, to the AP, the UL QoS data based on the channel access.

2. The method of claim 1, wherein the UL QoS data does not include low latency data.

3. The method of claim 1, wherein the physical version of the TB PPDU is related to an Extremely High Throughput (EHT).

4. A station (STA) used in a wireless local area network system, the STA comprising:

a transceiver to transmit and receive a wireless signal; and
a processor connected to the transceiver,
wherein the processor is configured to:
transmit, to an access point (AP), a first frame including a first Operating Mode (OM) control field having a value of zero, wherein a value of the first OM control field is determined based on whether trigger-based uplink multi-user (UL MU) transmission are enabled by the STA;

in response to the first OM control field, receive, from the AP, a second frame including a second OM control field to enable the trigger-based UL MU transmission;

receive, from the AP, a trigger frame soliciting the trigger-based UL MU transmission;

in response to the trigger frame, transmit, to the AP, a Trigger-Based (TB) Physical Protocol Data Unit (PPDU), wherein the TB PPDU includes a Legacy Signal (L-SIG) field, a Repeated Legacy Signal (RL-SIG) field which is contiguous to the L-SIG field, and a Universal Signal (U-SIG) field which is contiguous to the RL-SIG field, wherein the L-SIG field includes a length field which is set to a value satisfying a condition that a remainder is zero when the length field is divided by three, wherein the RL-SIG field is a repeat of the L-SIG field, wherein the U-SIG field includes three-bit information indicating a physical version of the TB PPDU, wherein the TB PPDU carries UL Quality of Service (QoS) data;

after determining that the TB PPDU is not successfully received by the AP, determine a type of an enhanced distributed channel access (EDCA) parameter based on a time delay value related to the UL QoS Data, wherein a type of EDCA parameter is determined to be an MU EDCA parameter based on the time delay value of the UL QoS data;

perform channel access based on the MU EDCA parameter; and transmit, to the AP, the UL QoS data based on the channel access.

5. The STA of claim 4, wherein the UL QoS data does not include low latency data.

6. The STA of claim 4, wherein the physical version of the TB PPDU is related to an Extremely High Throughput (EHT).

* * * * *